(12) United States Patent
Dudar et al.

(10) Patent No.: US 10,997,803 B2
(45) Date of Patent: May 4, 2021

(54) SYSTEMS AND METHODS FOR FUEL TANK DIAGNOSTICS

(71) Applicant: Ford Global Technologies, LLC, Dearborn, MI (US)

(72) Inventors: Aed M. Dudar, Canton, MI (US); Scott Alan Bohr, Novi, MI (US); Wolfgang Krings, Kall (DE)

(73) Assignee: Ford Global Technologies, LLC, Dearborn, MI (US)

( * ) Notice: Subject to any disclaimer, the term of this patent is extended or adjusted under 35 U.S.C. 154(b) by 769 days.

(21) Appl. No.: 15/728,884

(22) Filed: Oct. 10, 2017

(65) Prior Publication Data
US 2019/0108693 A1    Apr. 11, 2019

(51) Int. Cl.
| G07C 5/08 | (2006.01) |
| G07C 5/00 | (2006.01) |
| F02D 41/22 | (2006.01) |
| F02D 41/00 | (2006.01) |
| B60K 15/03 | (2006.01) |
| B60K 15/077 | (2006.01) |
| F02M 25/08 | (2006.01) |
| F02M 37/00 | (2006.01) |

(52) U.S. Cl.
CPC ............ *G07C 5/0808* (2013.01); *B60K 15/03* (2013.01); *B60K 15/03177* (2013.01); *B60K 15/077* (2013.01); *F02D 41/004* (2013.01); *F02D 41/22* (2013.01); *F02M 25/0809* (2013.01); *F02M 37/0076* (2013.01); *G07C 5/008* (2013.01); *G07C 5/0816* (2013.01); *B60K 2015/03197* (2013.01); *B60K 2015/03296* (2013.01); *B60K 2015/03328* (2013.01); *B60K 2015/03493* (2013.01); *F02D 2041/224* (2013.01)

(58) Field of Classification Search
CPC .... G07C 5/0808; G07C 5/008; G07C 5/0816; F02D 41/22; F02D 41/004; F02D 2041/224; B60K 15/03; B60K 15/03177; B60K 15/077; B60K 2015/03197; B60K 2015/03296; B60K 2015/03328; B60K 2015/03493; F02M 25/0809; F02M 37/0076
See application file for complete search history.

(56) References Cited

U.S. PATENT DOCUMENTS 3,645,416 A * 2/1972 Main, Jr. ................ B65D 90/52
                                                    220/563
5,913,451 A * 6/1999 Madison ................ B60K 15/01
                                                    220/723

(Continued)

*Primary Examiner* — Harry Y Oh
(74) *Attorney, Agent, or Firm* — Geoffrey Brumbaugh; McCoy Russell LLP

(57) ABSTRACT

Methods and systems are provided for conducting a fuel tank diagnostic. In one example, a method comprises sealing a fuel tank of a vehicle, retrieving data related to fuel tank pressure from a crowd of vehicles, and indicating the fuel tank of the vehicle being diagnosed is degraded responsive to data related to fuel tank pressure from the crowd insufficiently correlating with a set of data related to fuel tank pressure from the vehicle. In this way, fuel tank degradation may be indicated without coupling the fuel tank of the vehicle to atmosphere, which may reduce a release of undesired evaporative emissions to atmosphere.

19 Claims, 11 Drawing Sheets

(56) References Cited

U.S. PATENT DOCUMENTS

| | | | |
|---|---|---|---|
| 6,338,420 B1* | 1/2002 | Pachciarz | B60K 15/03177 220/4.13 |
| 2015/0219522 A1* | 8/2015 | Tseng | F02D 41/22 701/102 |
| 2016/0152132 A1* | 6/2016 | Dedeurwaerder | F16K 17/00 137/14 |
| 2017/0342931 A1* | 11/2017 | Dudar | B60K 15/03 |

* cited by examiner

SYSTEMS AND METHODS FOR FUEL TANK DIAGNOSTICS

FIELD

The present description relates generally to methods and systems for determining whether a vehicle fuel tank is degraded, using vehicle-to-vehicle (V2V) communications technology.

BACKGROUND/SUMMARY

Plug-in Hybrid Electric Vehicles (PHEVs) have fuel tanks that are sealed, for example via a fuel tank isolation valve under control of a vehicle controller. The fuel tanks of PHEVs are sealed due to limited engine run time. For example, a fuel vapor storage canister may be positioned in an evaporative emissions system, to capture and store fuel vapors from a fuel tank. Periodically, when the engine is running, intake manifold vacuum is applied to the fuel vapor canister, to draw fuel vapors from the canister and route the vapors to engine intake for combustion. However, because of limited engine run time in PHEVs, if the fuel tank were not sealed (e.g. vented to atmosphere), prolonged electric-only operation of the vehicle may result in fuel vapors overloading the canister, which may further result in undesired evaporative emissions (e.g. hydrocarbons) being emitted to atmosphere.

In some examples, the sealed fuel tank of PHEVs comprises a steel fuel tank. However, steel fuel tanks add weight to the vehicle, which may adversely affect battery life and/or fuel economy. Thus, to reduce vehicle weight and improve fuel economy, fuel tanks for PHEVs in the future may be made out of plastic. To provide structural integrity to such fuel tanks, structural standoffs may be placed inside the plastic fuel tanks. However, there may be circumstances where the structural standoffs become degraded. The inventors have herein recognized this issue, and have developed systems and methods to address such an issue. In one example, a method comprises sealing a fuel tank of a vehicle being diagnosed, retrieving data related to fuel tank pressure from a crowd of related vehicles, and indicating that the fuel tank of the vehicle being diagnosed is degraded responsive to data related to fuel tank pressure from the crowd insufficiently correlating with a set of data related to fuel tank pressure from the vehicle being diagnosed. In this way, it may be ascertained as to whether the fuel tank of the vehicle being diagnosed is degraded, without coupling the fuel tank to atmosphere, which may reduce opportunities for undesired evaporative emissions being released to atmosphere while conducting the diagnostic.

In one example, retrieving data related to fuel tank pressure from the crowd may include retrieving data wirelessly from the crowd via a controller of the vehicle being diagnosed.

In some examples, such a method may further comprise, prior to retrieving data related to fuel tank pressure from the crowd, conducting a test for a presence or an absence of undesired evaporative emissions stemming from the fuel tank of the vehicle being diagnosed, and may include retrieving data related to fuel tank pressure from the crowd responsive to an indication of the absence of undesired evaporative emissions stemming from the fuel tank of the vehicle being diagnosed, where retrieving data related to fuel tank pressure from the crowd further comprises a key-off condition for the vehicle being diagnosed.

In some examples of such a method, the crowd of vehicles may include vehicles with a similar make/model of the vehicle being diagnosed, vehicles with sealed fuel tanks, vehicles with fuel levels within a predetermined fuel level range, vehicles that have not been in operation for a threshold key-off duration and/or vehicles within a predetermined distance of the vehicle being diagnosed. For example, the predetermined fuel level range may include fuel levels within a threshold fuel level of a fuel level indicated for the vehicle being diagnosed.

In some examples of the method, data related to fuel tank pressure from the crowd may include one or more data sets comprising fuel tank pressure data and one or more data sets comprising fuel level data from fuel tanks of vehicles comprising the crowd, and wherein the set of data related to fuel tank pressure from the vehicle being diagnosed includes a set of fuel level data from the vehicle being diagnosed, and a set of fuel tank pressure data from the vehicle being diagnosed.

In some examples of the method, data related to fuel tank pressure from the crowd insufficiently correlating with the set of data related to fuel tank pressure from the vehicle being diagnosed includes an indication that data related to fuel tank pressure from the crowd is not within a predetermined threshold of the set of data related to fuel tank pressure from the vehicle being diagnosed.

In some examples of the method, retrieving data related to fuel tank pressure from the crowd includes retrieving data related to fuel tank pressure from the crowd for a predetermined time period encompassing a maximum and/or minimum temperature of a diurnal cycle.

In some of the method examples, such a method may further comprise taking mitigating action responsive to an indication that the fuel tank of the vehicle being diagnosed is degraded. For example, mitigating action may include fluidically coupling the fuel tank to a fuel vapor storage canister positioned in an evaporative emissions system of the vehicle, and wherein the fuel tank and the fuel vapor storage canister are further fluidically coupled to atmosphere.

In some examples of the method, indicating the fuel tank of the vehicle being diagnosed is degraded includes indicating that one or more structural supports in the fuel tank are degraded, or are not functioning as desired. In some examples, the fuel tank of the vehicle may be plastic, and the vehicle may comprise a hybrid vehicle, for example a hybrid electric vehicle.

Another example of a method may comprise responsive to conditions being met for conducting a fuel tank diagnostic on a vehicle being diagnosed as to whether one or more structural standoffs configured to provide structural integrity to the fuel tank are functioning as desired: sealing a fuel tank of the vehicle being diagnosed; sending a wireless request from a controller of the vehicle being diagnosed to one or more vehicles; selecting a crowd of vehicles from the one or more vehicles from which to retrieve information pertaining to fuel tank pressure from, via the controller of the vehicle being diagnosed; retrieving the information pertaining to fuel tank pressure wirelessly from the crowd of vehicles; comparing the information pertaining to fuel tank pressure from the crowd of vehicles subsequent to also retrieving a set of data pertaining to fuel tank pressure from the vehicle being diagnosed; and indicating that one or more of the one or more structural standoffs of the vehicle being diagnosed are degraded responsive to the information pertaining to fuel tank pressure from the crowd not correlating with the set of data pertaining to fuel tank pressure from the vehicle being diagnosed.

In an example of such a method, conditions being met for conducting the fuel tank diagnostic may include a key-off condition of the vehicle being diagnosed, a time since key-off greater than a threshold duration, and/or an indication that the fuel tank of the vehicle being diagnosed is free from a presence of undesired evaporative emissions.

In another example of such a method, selecting the crowd may include excluding vehicles from the crowd that comprise vehicles that are not of the same make/model of the vehicle being diagnosed, excluding vehicles from the crowd that comprise vehicles without sealed fuel tanks, excluding vehicles from the crowd that do not have fuel levels within a predetermined fuel level range, and excluding vehicles from the crowd that have not been deactivated or shut down for a threshold key-off duration.

In another example of such a method, subsequent to sealing the fuel tank of the vehicle being diagnosed and prior to sending the wireless request from the controller of the vehicle being diagnosed to one or more vehicles, sleeping the controller of the vehicle being diagnosed, the controller of the vehicle being diagnosed may be woken up at a predetermined time point near either a maximum temperature of a diurnal cycle or a minimum temperature of the diurnal cycle to select the crowd of vehicles, to retrieve the information pertaining to fuel tank pressure from the crowd, and to also retrieve the set of data pertaining to fuel tank pressure from the vehicle being diagnosed.

In another example of such a method, the method may further comprise taking mitigating action responsive to the indication that one or more of the one or more structural standoffs of the vehicle being diagnosed are degraded. For example, taking mitigating action may include unsealing the fuel tank of the vehicle being diagnosed to fluidically couple the fuel tank to atmosphere, capturing fuel vapors from the fuel tank of the vehicle being diagnosed in a fuel vapor storage canister positioned in an evaporative emissions system of the vehicle being diagnosed, and updating a schedule for purging the fuel vapor storage canister in order to purge fuel vapors from the fuel vapor storage canister more frequently responsive to the fuel tank being fluidically coupled to the fuel vapor storage canister.

A system for a hybrid vehicle may comprise a fuel tank selectively fluidically coupled to a fuel vapor canister via a conduit; a fuel tank isolation valve positioned within the conduit between the fuel tank and the fuel vapor canister and configured to seal the fuel tank from the fuel vapor canister and from atmosphere when closed; a fuel tank pressure transducer (FTPT) positioned in a vapor recovery line between the fuel tank and the fuel tank isolation valve; a fuel level indicator positioned in the fuel tank of the hybrid vehicle; a wireless communication device; and a controller. The controller may be configured with instructions stored in non-transitory memory, that when executed cause the controller to seal the fuel tank, obtain weather forecast data wirelessly to the controller to determine a maximum temperature and a minimum temperature corresponding to a current diurnal cycle, schedule a predetermined time to wake the controller near the maximum temperature or the minimum temperature, and sleep the controller subsequent to scheduling the time to wake the controller. At the predetermined time, the controller may be woken to conduct a fuel tank diagnostic on the fuel tank of the hybrid vehicle. The fuel tank diagnostic may be conducted by retrieving fuel tank pressure data and fuel level data from a crowd of vehicles within a predetermined distance of the hybrid vehicle, retrieving a set of fuel tank pressure data and a set of fuel level data from the hybrid vehicle, and comparing fuel tank pressure data and fuel level data from the crowd with the set of fuel tank pressure data and the set of fuel level data from the hybrid vehicle. It may thus be indicated whether the fuel tank of the hybrid vehicle is degraded responsive to fuel tank pressure data and fuel level data from the crowd not correlating, or insufficiently correlating, with the set of fuel tank pressure data and the set of fuel level data, respectively. To prevent further degradation of the fuel tank, mitigating action may be taken, including fluidically coupling the fuel tank of the hybrid vehicle to the fuel vapor canister and to atmosphere.

In such a system, the system may further comprise a temperature sensor positioned in the fuel vapor canister and configured to indicate a canister loading state based on temperature changes within the fuel vapor canister. Furthermore, the controller may store further instructions to update a purge schedule for the fuel vapor canister to purge the fuel vapor canister responsive to indications that the canister loading state is greater than a threshold loading state.

In such a system, the controller may store further instructions to indicate the fuel tank of the hybrid vehicle is degraded responsive to fuel tank pressure data and fuel level data from the crowd not correlating (or insufficiently correlating) with the set of fuel tank pressure data and the set of fuel level data, where not correlating (or insufficiently correlating) comprises fuel tank pressure data from the crowd differing by greater than 5% from the set of fuel tank pressure data from the hybrid vehicle, and/or fuel level data from the crowd differing by greater than 5% from the set of fuel level data from the hybrid vehicle.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for conducting a fuel tank diagnostic to indicate whether a vehicle fuel tank is degraded. More specifically, the fuel tank diagnostic may provide an indication as to whether one or more structural standoffs in the vehicle fuel tank are degraded, or not functioning as desired. Such a diagnostic may be conducted while the fuel tank of the vehicle being diagnosed (VD) remains sealed, thus reducing opportunities for release of undesired evaporative emissions (e.g. hydrocarbon emissions) to atmosphere. Accordingly, such a diagnostic may be carried out in a hybrid vehicle, with limited engine run-time, and where the fuel tank is sealed under typical vehicle operating conditions, such as the hybrid vehicle depicted at FIG. 1. The fuel tank of such a vehicle may be sealed via a fuel tank isolation valve, such as that depicted at FIG. 2. The fuel tank isolation valve may seal the fuel tank from an evaporative emissions system, where the evaporative emissions system may include a fuel vapor storage canister.

Figure 3:
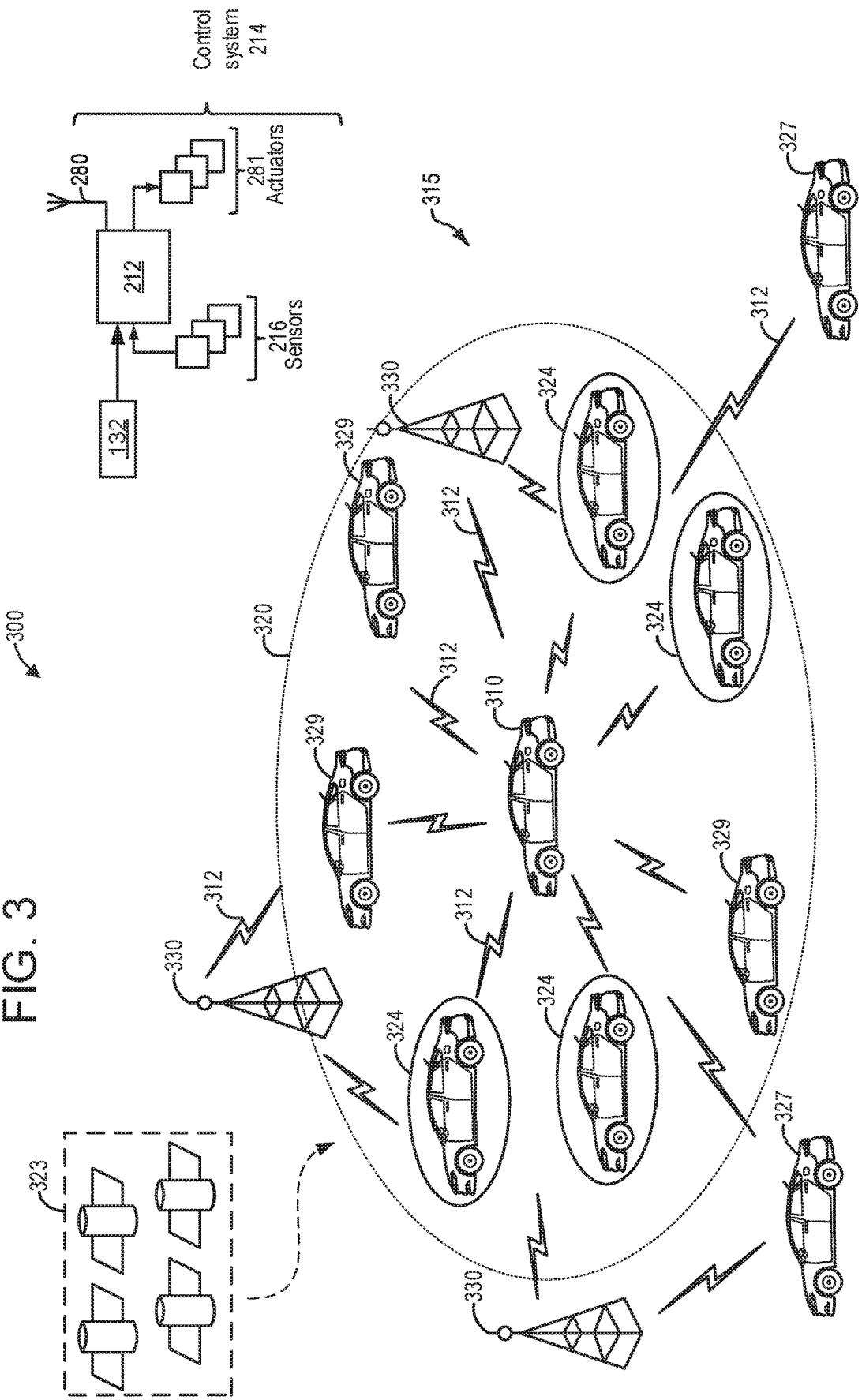
FIG. 3 schematically illustrates a system and methods for determining whether structural standoffs in a vehicle fuel tank are degraded, using vehicle-to-vehicle (V2V) or vehicle-to-infrastructure-to-vehicle (V2I2V) technology.
Figure 4:
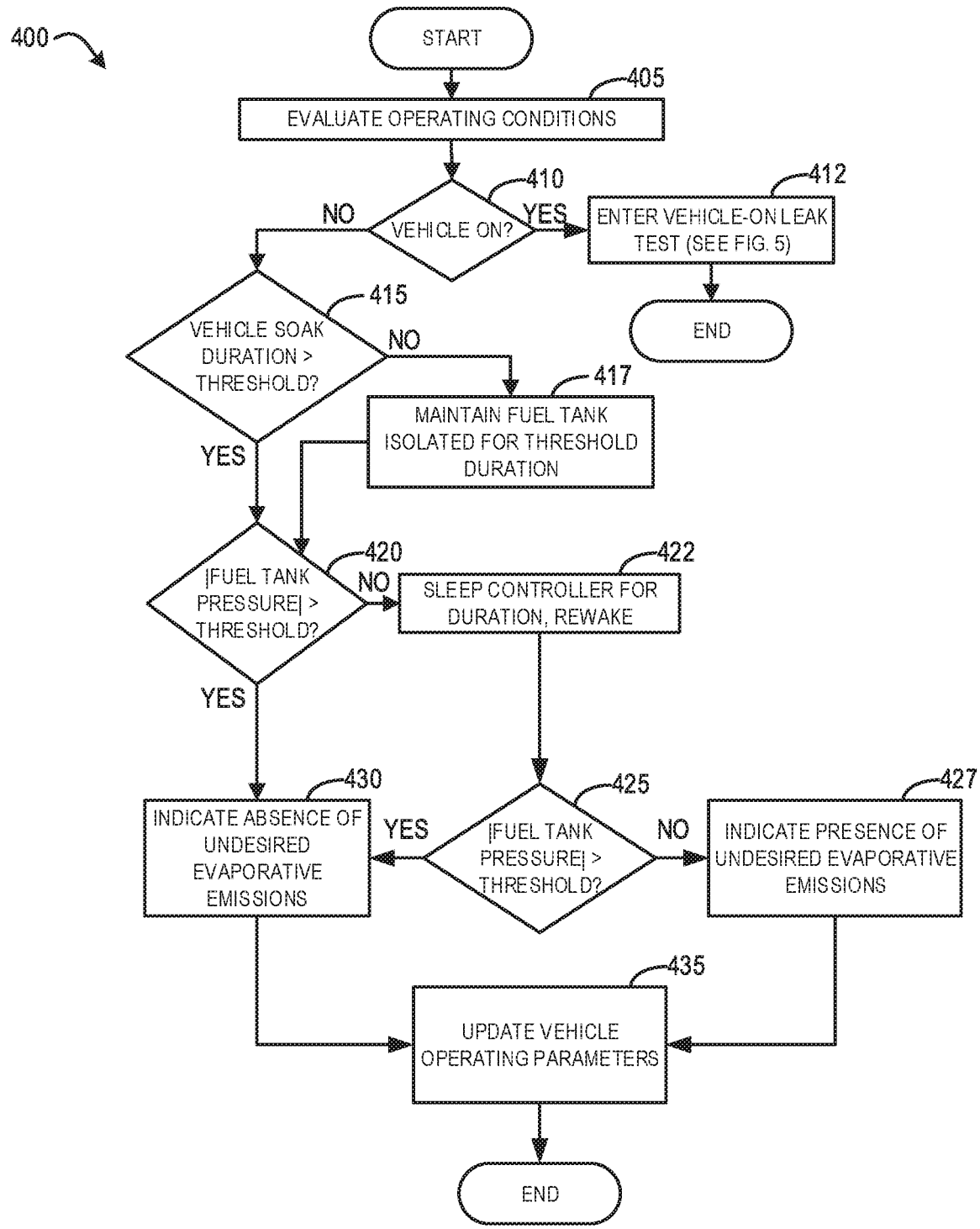
FIG. 4 depicts a high-level flow chart for an example method for conducting a test for undesired evaporative emissions stemming from a vehicle fuel tank while the vehicle is not in operation.
Figure 5:
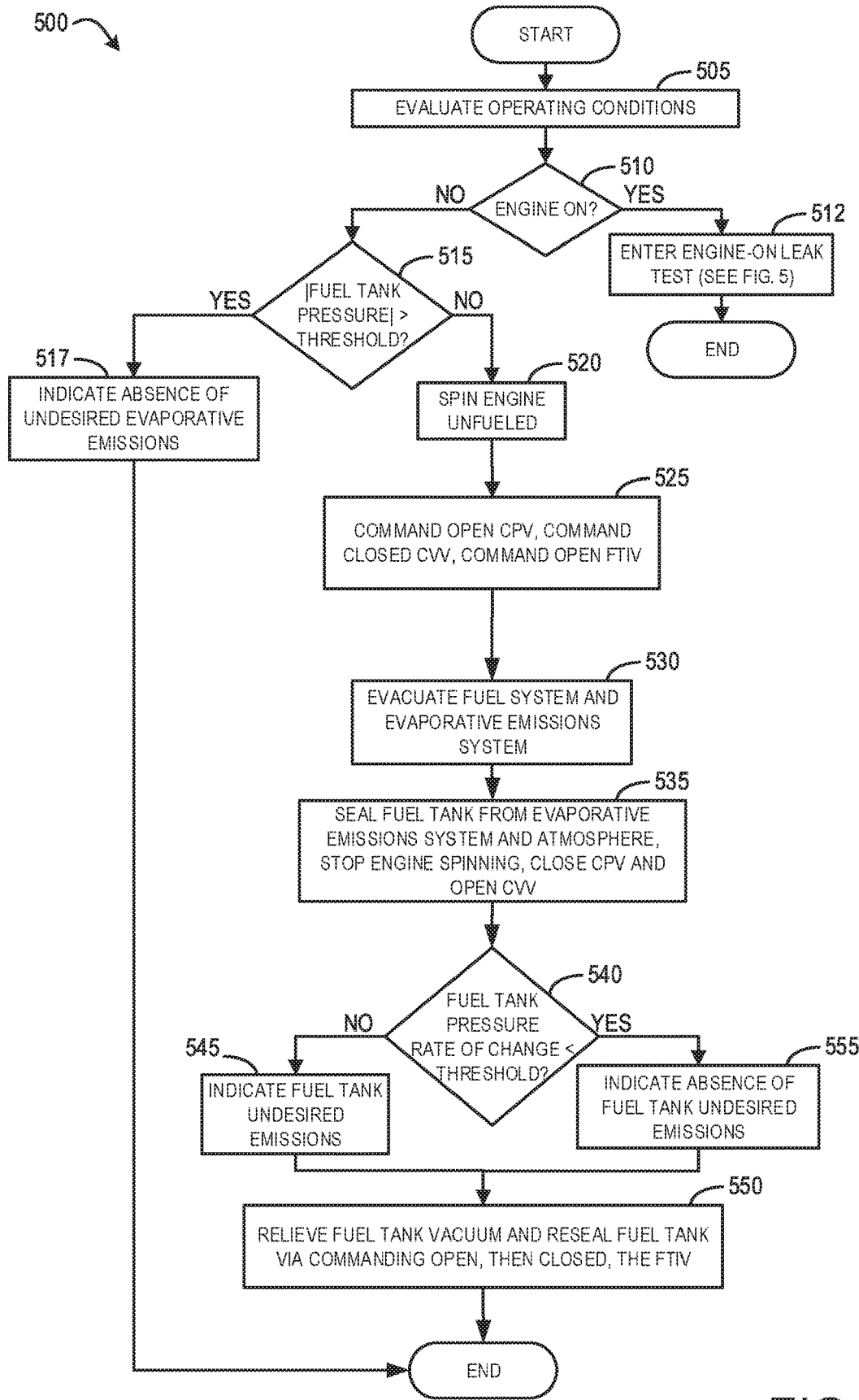
FIG. 5 depicts a high-level flow chart for an example method for conducting a test for undesired evaporative emissions stemming from a vehicle fuel tank while the vehicle is in operation with the engine off.
Figure 6:
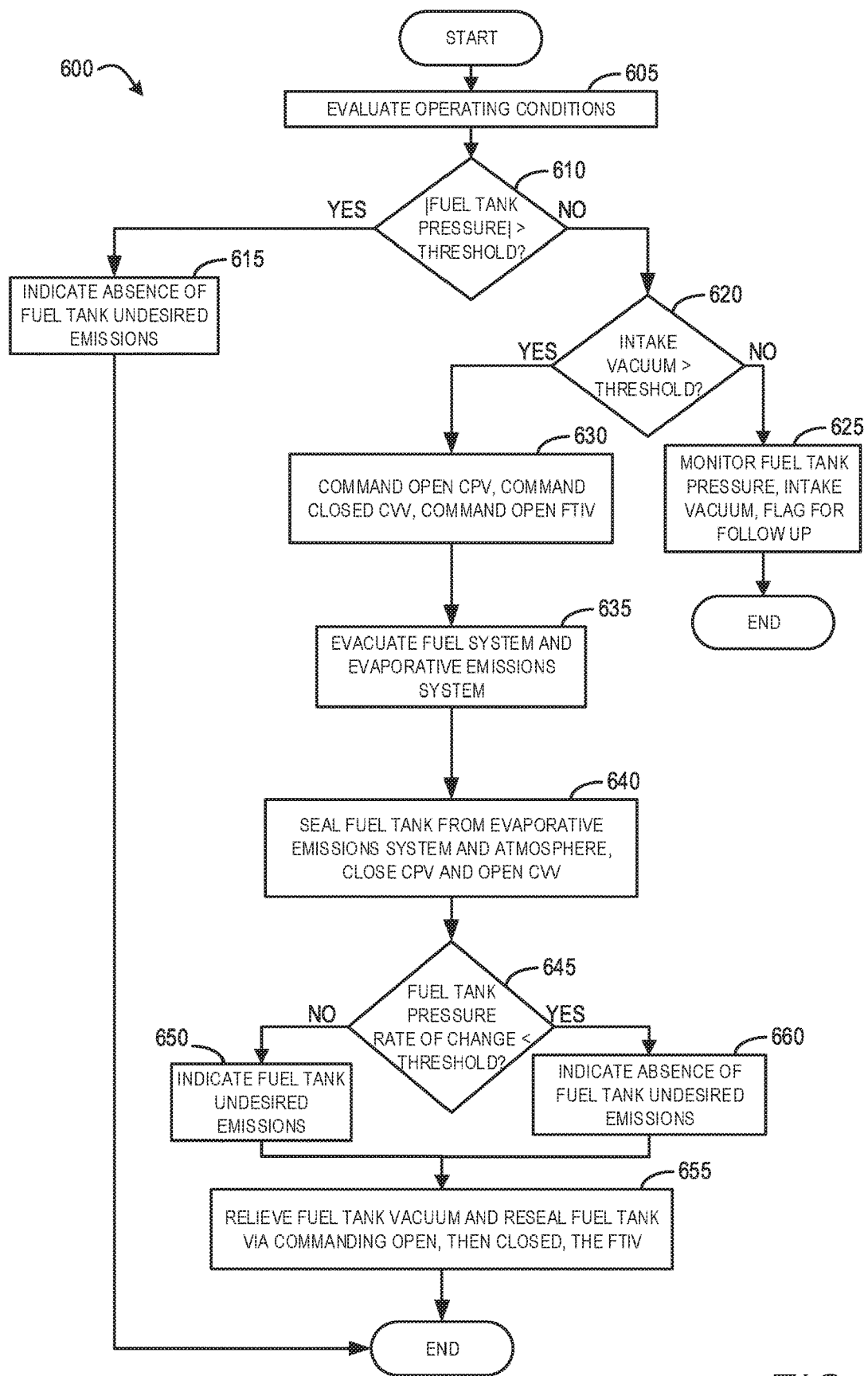
FIG. 6 depicts a high-level flow chart for an example method for conducting a test for undesired evaporative emissions stemming from a vehicle fuel tank while the vehicle is in operation with the engine combusting air and fuel.
Figure 7:
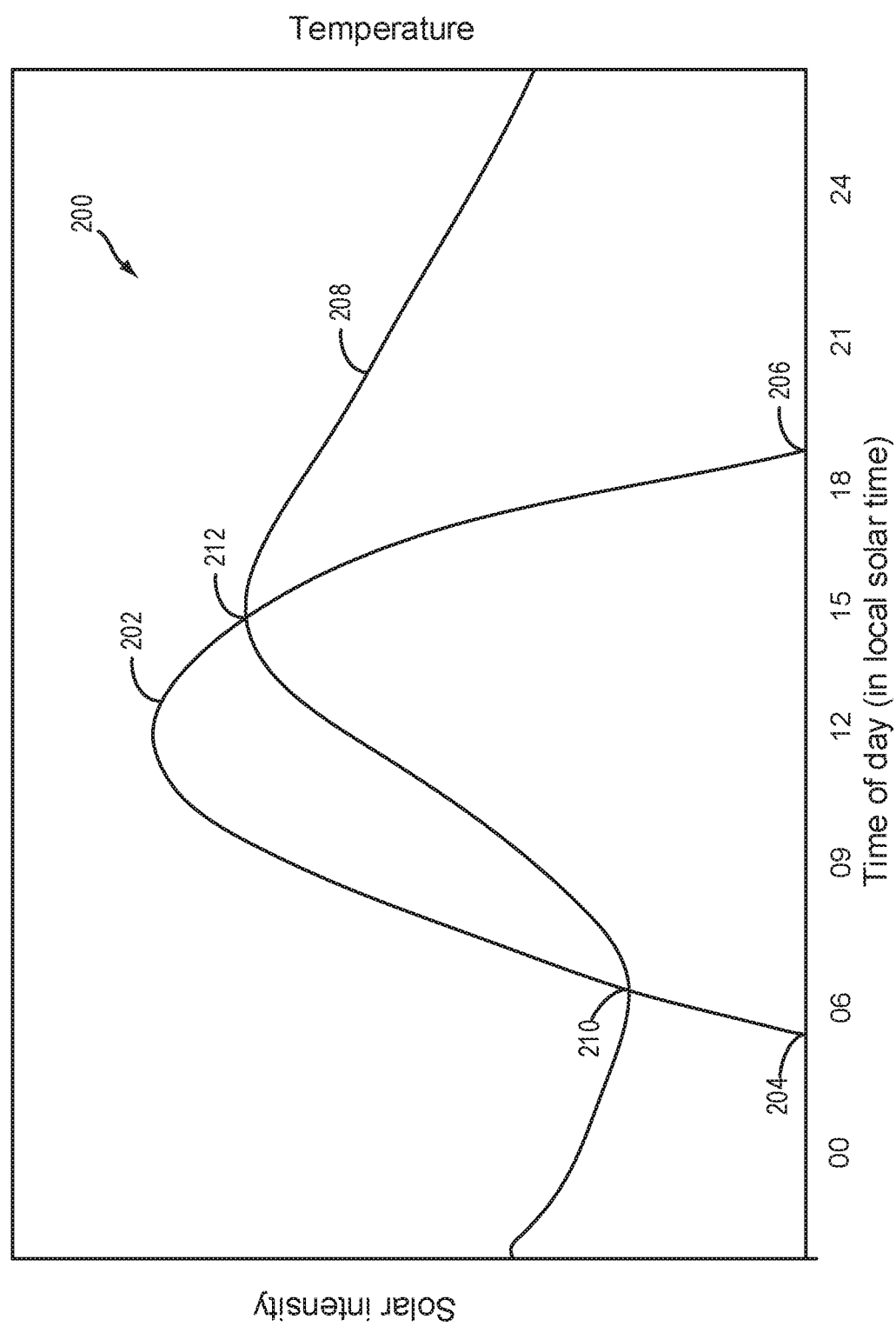
FIG. 7 depicts an illustration of a diurnal cycle.
Figure 8:
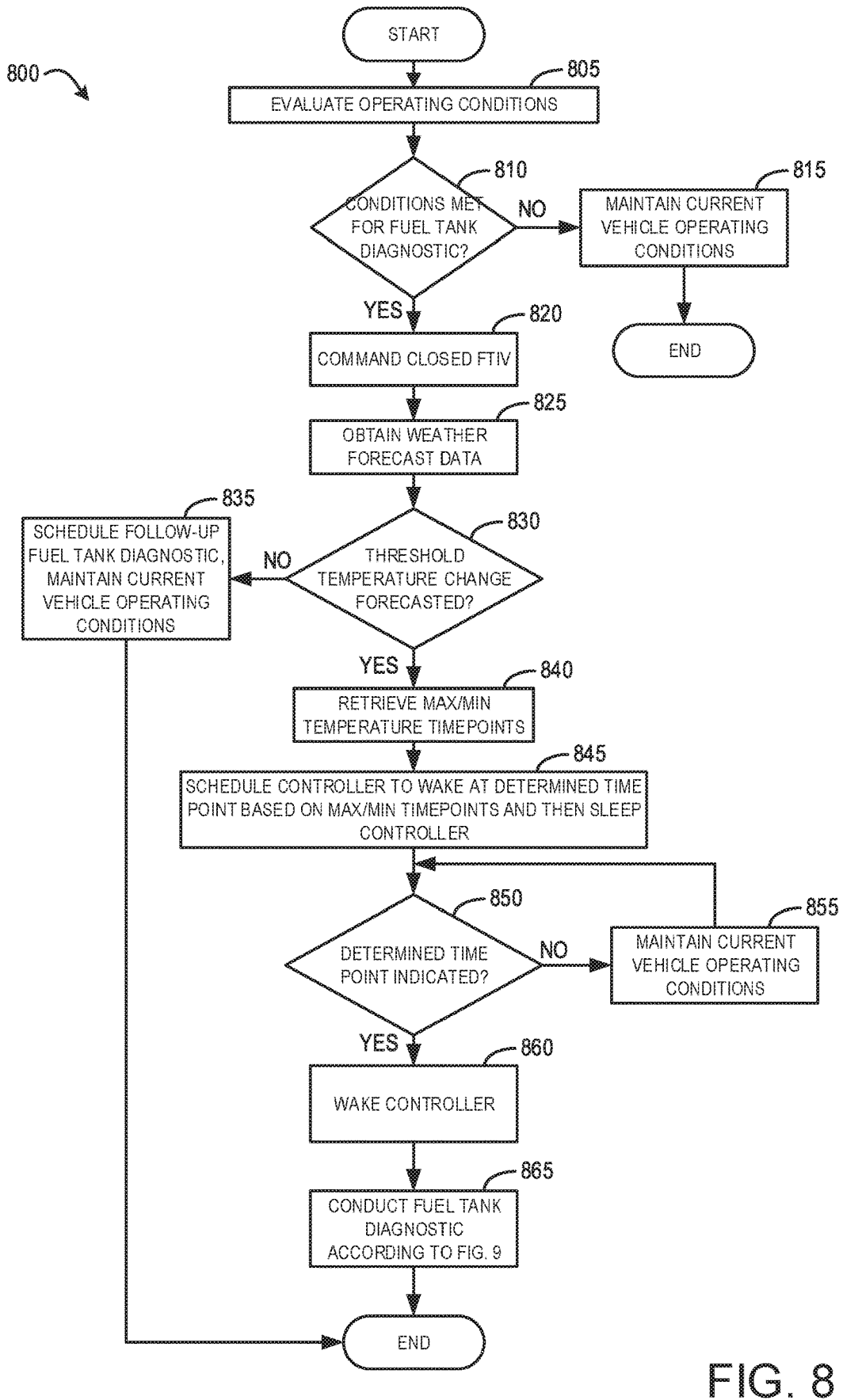
FIG. 8 depicts a high-level flow chart for an example method for entering into a fuel tank diagnostic.
Figure 9:
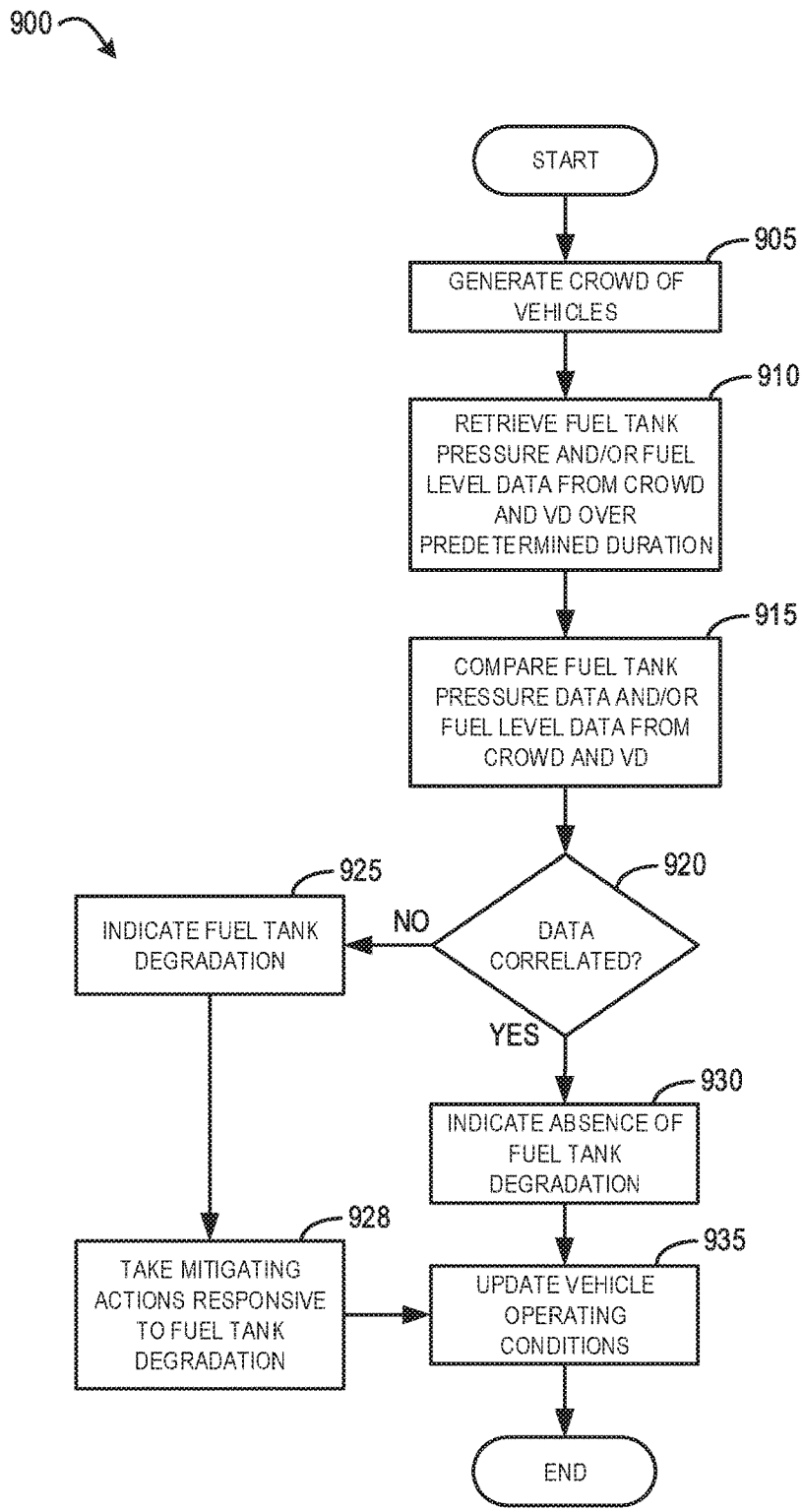
FIG. 9 depicts a high-level flow chart for an example method for conducting a fuel tank diagnostic.
Figure 10:
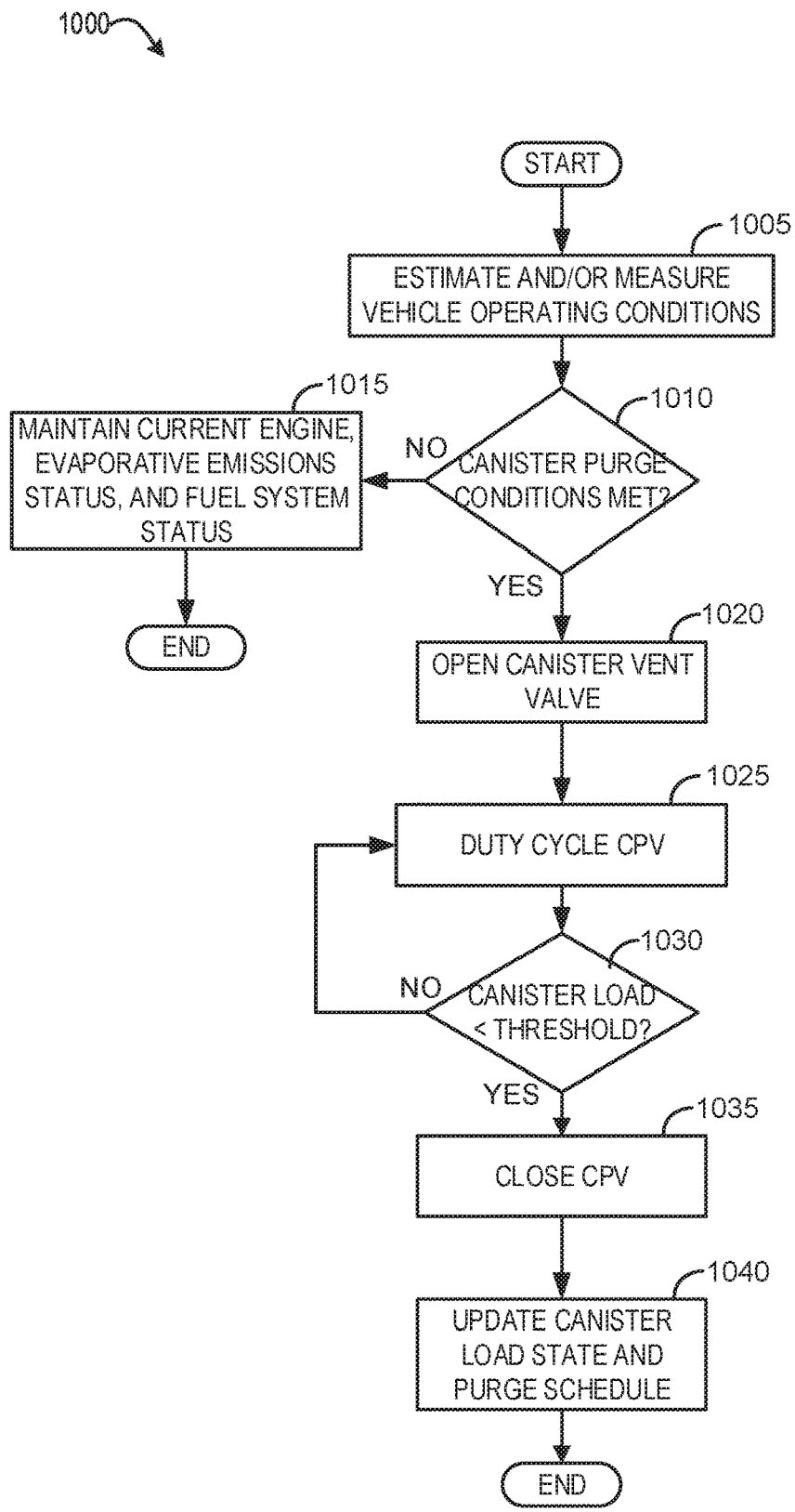
FIG. 10 depicts a high-level flow chart for an example method for conducting a fuel vapor canister purging operation.
Figure 11:
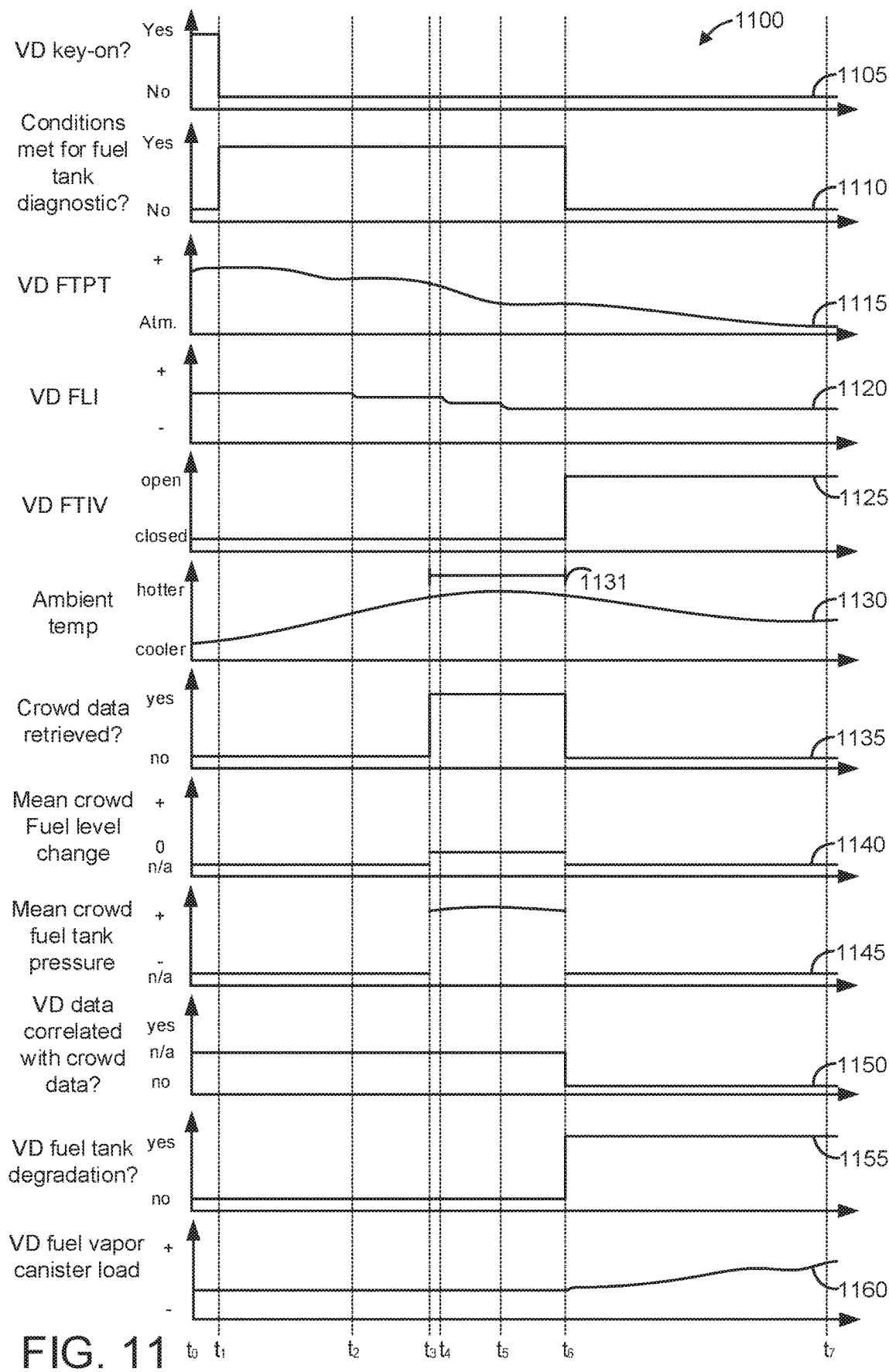
FIG. 11 schematically illustrates an example timeline for conducting a fuel tank diagnostic, according to the methods illustrated at FIGS. 8-9.

The fuel tank diagnostic may be conducted by obtaining information related to fuel tank pressure and fuel level from vehicles comprising a crowd, as illustrated at FIG. 3. For the diagnostic to be robust, it may first be ascertained as to whether there is a presence of undesired evaporative emissions stemming from the fuel tank of the VD. FIGS. 4-6 depict example methods for determining, in a vehicle with a sealed fuel tank, whether a source of undesired evaporative emissions is/are present in the fuel tank. Responsive to an indication that undesired evaporative emissions are not stemming from the fuel tank (e.g. absence of undesired evaporative emissions), and further responsive to conditions being met for conducting the fuel tank diagnostic, the fuel tank diagnostic may include wirelessly communicating with the crowd of vehicles to retrieve fuel tank pressure and fuel level data. In one example, the controller of the VD may obtain the fuel tank pressure and fuel level data at either a maximum or minimum temperature of a diurnal cycle, as depicted at FIG. 7. FIG. 8 depicts an example methodology for entering into the fuel tank diagnostic, while FIG. 9 depicts an example methodology for conducting the fuel tank diagnostic. In some examples, responsive to an indication that the fuel tank of the VD is degraded, mitigating actions may be undertaken, such as coupling the fuel tank to the fuel vapor storage canister. Such an action may thus result in it being desirable to purge the canister of fuel tank vapors more frequently, and accordingly, a method for purging the VD fuel vapor storage canister is depicted at FIG. 10. An example timeline for conducting the fuel tank diagnostic, is illustrated at FIG. 11.

Figure 1:
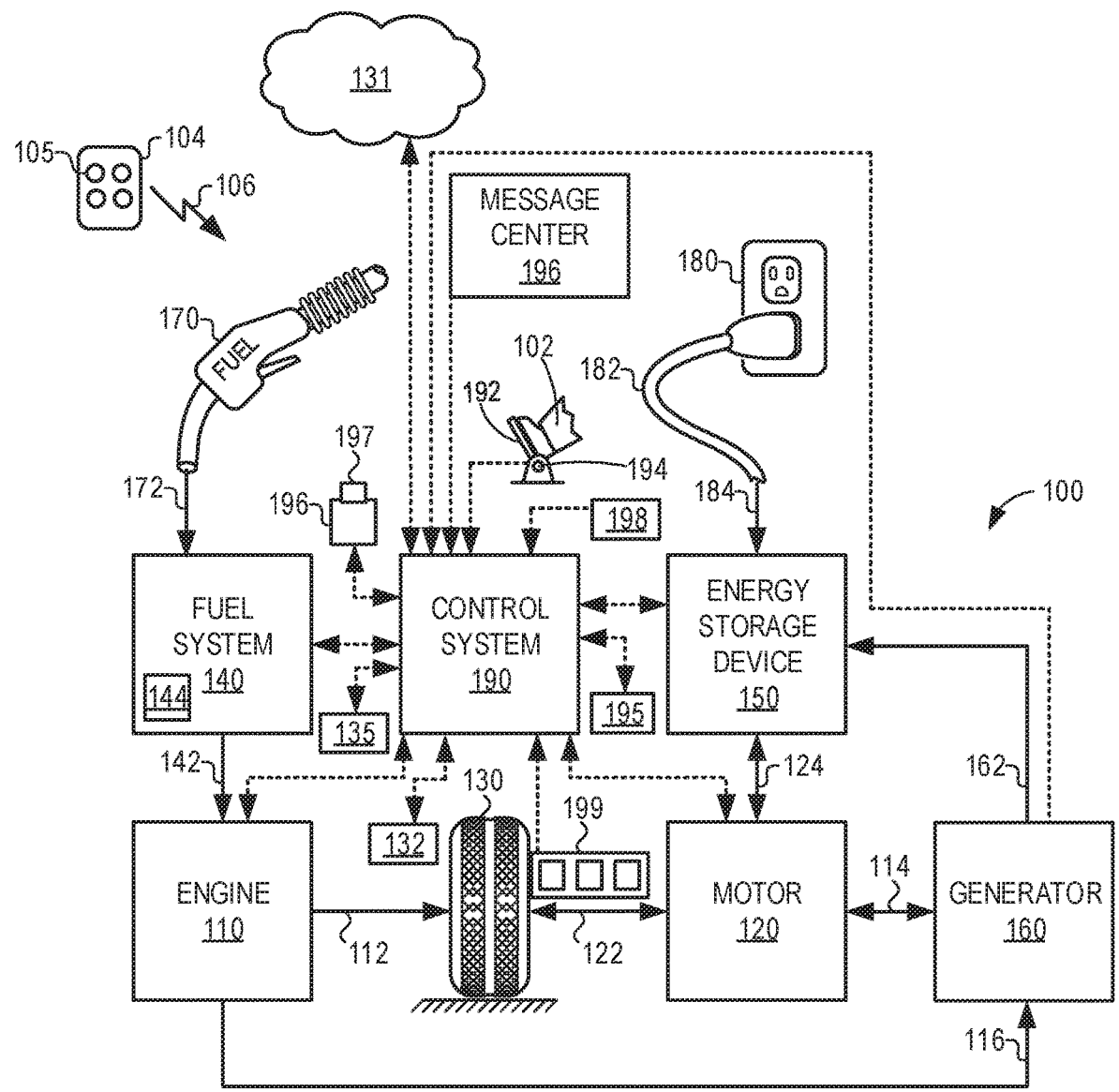
FIG. 1 shows a high-level block diagram illustrating an example vehicle system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc.

Figure 2:
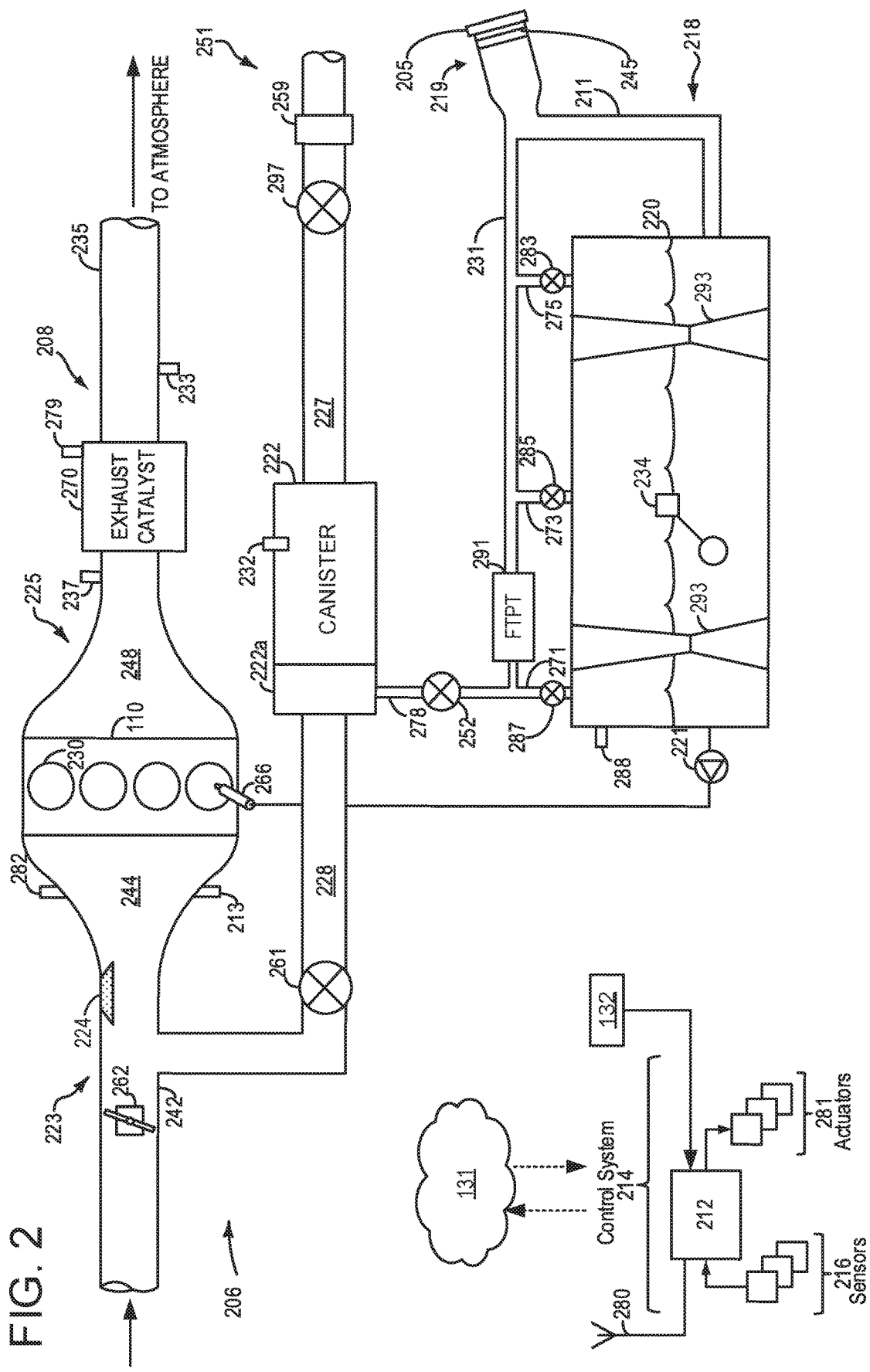
FIG. 2 schematically shows an example vehicle system with a fuel system and an evaporative emissions system.

FIG. 2 shows a schematic depiction of a vehicle system 206. It may be understood that vehicle system 206 may comprise the same vehicle system at vehicle propulsion system 100 depicted above at FIG. 1. The vehicle system 206 includes an engine system 208 coupled to an evaporative emissions control (Evap) system 251 and a fuel system 218. It may be understood that fuel system 218 may comprise the same fuel system as fuel system 140 depicted above at FIG. 1. Evap system 251 includes a fuel vapor container or canister 222 which may be used to capture and store fuel vapors. In some examples, vehicle system 206 may be a hybrid electric vehicle (HEV) system or a plug-in hybrid electric vehicle system (PHEV).

The engine system 208 may include an engine 110 having a plurality of cylinders 230. The engine 110 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalyst 270, which may be mounted in a close-coupled position in the exhaust. Exhaust catalyst may include a temperature sensor 279. In some examples one or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 110 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 110 is shut down.

Fuel system 218 may include a fuel tank 220 coupled to a fuel pump system 221. It may be understood that fuel tank 220 may comprise the same fuel tank as fuel tank depicted above at FIG. 1. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212, where controller 212 is a component of control system 214. It may be understood that control system 214 may comprise the same control system as control system 190 depicted above at FIG. 1. As depicted, fuel level sensor 234 may comprise a float connected to a variable resistor. Alternatively, other types of fuel level sensors may be used.

In the examples depicted herein, it may be understood that fuel tank 220 may comprise a plastic fuel tank. Accordingly, to provide structural integrity to the fuel tank, one or more structural standoffs 293 may be positioned in fuel tank 220. As will be discussed in detail below, there may be circumstances where the structural standoffs become degraded. Ideally, it is desirable to provide systems and methods for inferring whether the structural standoffs have become degraded. Such methodology will be discussed below with regard to FIGS. 4-6 and FIGS. 8-9.

Vapors generated in fuel system 218 may be routed Evap system 251, which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

As discussed, Evap system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations, "running loss" (that is, fuel vaporized during vehicle operation), and diurnal cycles. In one example, the adsorbent used is activated charcoal. Evap system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve (CVV) 297 coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere via CVV 297, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Undesired evaporative emissions detection routines may be intermittently performed by controller 212 on fuel system 218 and Evap system 251 to confirm that the fuel system 218 and Evap system 251 are not emitting undesired evaporative emissions. As such, evaporative emissions testing may be performed while the engine is off (engine-off test) using engine-off natural vacuum (EONV) generated due to a change in temperature and pressure at the fuel tank following engine shutdown. For example, responsive to an engine-off event, a fuel system may be isolated and the pressure in the fuel system may be monitored. Identification of undesired vapor emissions may be indicated based on a pressure rise below a threshold, or a rate of pressure rise below a threshold rate. Furthermore, as the fuel tank cools down, vacuum generation may be monitored and undesired vapor emissions identified based on development of a vacuum below a threshold, or a rate of vacuum development below a threshold rate.

In other examples, evaporative emissions testing routines may be performed while the engine is running by using engine intake manifold vacuum, or while the engine is either running or during engine-off conditions by operating a vacuum pump. For example, undesired evaporative emissions tests may be performed by an evaporative emissions check module (not shown) communicatively coupled to controller 212. An evaporative emissions check module may be coupled in vent 227, for example, between canister 222 and the atmosphere. An evaporative emissions check module may include a vacuum pump for applying negative pressure to the fuel system when administering an evaporative emissions test. In some embodiments, the vacuum pump may be configured to be reversible. In other words, the vacuum pump may be configured to apply either a negative pressure or a positive pressure on the fuel system.

In still other examples, evaporative emissions testing routines may be performed while the vehicle is in operation but where the vehicle is operating in an electric-only mode of operation. In such an example, the engine may be spun unfueled via, for example, the motor (e.g. 120) to generate intake manifold vacuum which may be communicated to the vehicle fuel system and/or evaporative emissions system, to diagnose potential undesired evaporative emissions. Such routines will be discussed in detail below with regard to FIGS. 4-6.

In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and in some cases while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be a default open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced.

As discussed, controller 212 may comprise a portion of a control system 214, where control system 214 may comprise the same control system as control system 190 depicted at FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291 (fuel tank pressure transducer), mass air flow (MAF) sensor 282, barometric pressure sensor 213, fuel tank temperature sensor 288, and canister temperature sensor 232. Other sensors such as pressure, temperature, air/fuel ratio, and composition sensors may be coupled to various locations in the vehicle system 206. As another example, the actuators may include fuel injector 266, throttle 262, fuel tank isolation valve 252, CPV 261, CVV 297 and refueling lock 245. The controller 212 may receive input data from the various sensors, process the input data, and trigger the actuators in response to the processed input data based on instruction or code programmed therein corresponding to one or more routines. Example control routines are described herein with regard to FIGS. 4-6, and FIGS. 8-10. In addition, controller 212 may receive data from a navigation system 132 (such as GPS) and/or a V2X network including a V2V network (vehicle-to-vehicle), a V2I network (vehicle to infrastructure), or a V2I2V (vehicle-to-infrastructure-to-vehicle) such as network 131 as discussed above with regard to FIG. 1. For example, a wireless communication device 280 may be coupled to the vehicle controller(s) 212, for enabling wireless communication.

In some examples, the controller may be placed in a reduced power mode or sleep mode, wherein the controller maintains essential functions only, and operates with lower battery consumption than in a corresponding awake mode. For example, the controller may be placed in a sleep mode following a vehicle-off event in order to perform a diagnostic routine at a duration following the vehicle-off event. The controller may have a wake input that allows the controller to be returned to an awake mode based on an input received from one or more sensors. In some examples, the controller may schedule a wake-up time, which may comprise setting a timer and when the timer elapses, the controller may be woken up from sleep mode.

Turning now to FIG. 3, an example illustration 300 is depicted detailing how a vehicle undergoing a fuel tank diagnostic (referred to herein as the vehicle being diagnosed, or VD) may obtain crowd information comprising one or more data sets related to fuel tank pressure and/or fuel level in vehicles that are similar to the vehicle being diagnosed, in order to determine whether structural standoffs (e.g., 293) in the fuel tank (e.g., 220) of the VD are degraded. As such, degradation of the structural standoffs may be diagnosed without venting the fuel tank, and without the use of onboard pumps, as will be discussed in further detail below. Such crowd information may be obtained by the VD via one or more of a vehicle-to-vehicle (V2V) network or a vehicle-to-infrastructure-to-vehicle (V2I2V) network, for example. Accordingly, FIG. 3 shows a vehicle 310 that is to be diagnosed (VD) for whether its structural standoffs are degraded, in wireless communication 312 with a number of other vehicles 315. It may be understood that vehicle 310 may comprise the same vehicle as vehicle propulsion system 100 depicted at FIG. 1 and/or vehicle system 206 depicted at FIG. 2. Vehicle 310 may include control system 214, including controller 212, as discussed above with regard to FIG. 2. Wireless communication device 280 may be coupled to controller 212, as discussed, for enabling wireless communication between vehicle 310 and vehicles 315. Furthermore, vehicle 310 may include a navigation device 132 (e.g., GPS), where the navigation device may be configured for receiving information via GPS satellites 323.

Control system 214 is shown receiving information from the plurality of sensors 216 and sending control signals to a plurality of actuators 218. As discussed, sensors 216 may include barometric pressure sensor (e.g., 213), mass air flow sensor (e.g., 282), fuel vapor canister temperature sensor (e.g., 232), exhaust gas sensor (e.g., 237), exhaust catalyst temperature sensor (e.g., 279), FTPT (e.g., 291), fuel tank temperature sensor (e.g., 288), fuel level sensor (e.g., 234) and ambient temperature/humidity sensor (e.g., 198). Based on the sensors in vehicle 310, various information may be indicated, such as whether the vehicle is in operation, an estimate of time since the vehicle was last operating, ambient temperature/humidity near the vehicle, pressure in the fuel tank, fuel level, etc. Furthermore, in some examples, onboard cameras (e.g., 135) may be additionally utilized in order to indicate whether the vehicle is operating, conditions in which the vehicle is parked in (e.g., shade, direct sunlight, etc.), vehicle location, etc.

While not explicitly shown, it may be understood that the other vehicles 315 may also include components as described for vehicle 310. For example, vehicles 315 may similarly include control systems with controllers receiving information from a plurality of sensors, and where commands may be sent from the controllers to a plurality of actuators. Furthermore, vehicles 315 may include wireless communication devices for sending and receiving wireless communication between vehicles or infrastructures.

Vehicle 310 may send and retrieve information wirelessly via V2V or V2I2V technology with vehicles 315 within a predetermined distance or radius 320 from vehicle 310. For example, vehicles 327 (where vehicles 327 are a subset of vehicles 315) may be excluded from having information retrieved from those vehicles, as they are outside of the predetermined distance 320 from vehicle 310. The predetermined distance may in some examples be set such that the vehicles from which information/data is to be retrieved are likely to be experiencing similar weather conditions such ambient temperature/humidity, etc., as the vehicle being diagnosed (e.g., 310).

Of the vehicles within the predetermined distance 320 from the vehicle to be diagnosed 310, it may be further determined which vehicles to retrieve one or more data sets from. In other words, of the vehicles within the predetermined distance 320 from the vehicle to be diagnosed 310, only a subset of those vehicles may make up a select crowd or crowd 324, that one or more data sets will be obtained from and utilized in order to conduct a diagnostic for whether the structural standoffs (e.g., 293) in vehicle 310 are degraded. The details of what may constitute such a crowd 324 will be elaborated in detail below with regard to the method illustrated in FIGS. 8-9. Briefly, selection criteria for the crowd 324 may be based on vehicle make/model (e.g., similar make/model to the vehicle being diagnosed), whether a vehicle's fuel tank comprises a sealed fuel tank, a fuel level within a predetermined fuel level range, whether or not the vehicle is within a proximity to structures that may affect temperature/ambient conditions experienced by the vehicle, whether the vehicle is in a key-off condition, a time since key-off, a fuel tank temperature within a predetermined fuel tank temperature range, engine run-time prior to a key-off event, etc. As such, vehicles within the predetermined distance 320 that are not identified as making up the select crowd 324 may be termed excluded vehicles 329.

Subsequent to identification of the select crowd 324, one or more data sets comprising information related to fuel tank pressure and fuel level may be retrieved from vehicles 315 by vehicle 310, via V2V or V2I2V technology. In one example, fuel tank pressure data may be obtained from vehicles 315. More specifically, it may be understood that, for vehicles with sealed fuel tanks, temperature fluctuations throughout a 24-hour period (e.g., diurnal cycle) may result in pressure/temperature changes within such sealed fuel tanks. As such, in some examples data related to fuel tank pressure from vehicles making up the select crowd may be retrieved at a predetermined point in the diurnal cycle (e.g. maximum or minimum temperature of the diurnal cycle). For example, at the maximum and/or minimum temperature of the diurnal cycle, fuel tank pressure from fuel tanks comprising the select crowd 324 may be retrieved via vehicle 310. The controller of vehicle 310 may then average the fuel tank pressure data corresponding to either the maximum or minimum temperature, to arrive at a mean maximum or mean minimum fuel tank pressure for select crowd 324. Such information on the direction (e.g. positive pressure with respect to atmosphere or negative pressure with respect to atmosphere) and magnitude of fuel tank pressure corresponding to the select crowd 324 may next be compared (via the controller of vehicle 310) to data obtained on fuel tank pressure for the vehicle being diagnosed 310. If fuel tank pressure data obtained from the vehicle being diagnosed 310 correlates with the fuel tank pressure data obtained from the select crowd 324, it may be determined that the structural standoffs (e.g. 293) are functioning as desired. In such an example fuel tank pressure data from the select crowd 324 and fuel tank pressure data from the vehicle being diagnosed 310 being "correlated" may include the fuel tank pressure data from vehicle being diagnosed 310 being within a predetermined threshold (e.g. within 5% or less) of the vehicles comprising the select crowd. However, if fuel tank pressure in the vehicle being diagnosed 310 does not correlate (e.g. differing by greater than 5%) with the fuel tank pressure data obtained from the select crowd 324, it may be determined that the structural standoffs in the vehicle being diagnosed may be degraded.

In some examples, the one or more data sets being retrieved from the select crowd 324 may additionally include fuel level in fuel tanks of each of the vehicles comprising the select crowd 324. For example, if fuel level in the vehicle being diagnosed is aberrant or fluctuating over a predetermined time period, as compared to a fuel level corresponding to an average fuel level from the vehicles comprising the select crowd, it may be determined that the structural standoffs in the vehicle being diagnosed are degraded. In the above example, "aberrant or fluctuating" may comprise fuel level changes in the vehicle being diagnosed being 5% or greater (in either direction, for example increasing fuel level or decreasing fuel level) as compared to the average fuel level from the vehicles comprising the select crowd. In such an example, fuel level measurements may be retrieved from vehicles comprising the select crowd over a predetermined duration or predetermined time period, and may then be compared to fuel level measurements retrieved from the vehicle being diagnosed 310, recorded over the same predetermined time period. In such an example, the predetermined time period may comprise a specified amount of time around the maximum and/or minimum temperature of the diurnal cycle. More specifically, the predetermined time period may comprise between 15 and 30 minutes, between 30 minutes and 1 hour, greater than 1 hour but less than 2 hours, or greater than 2 hours but less than 3 hours. By recording fuel level in the vehicle being diagnosed over the predetermined time period, and comparing that fuel level to a mean fuel level based on data retrieved from the select crowd over the same predetermined time period, it may be determined whether the structural standoffs are degraded.

It may be understood that the methodology depicted above with regard to FIG. 3 may be applicable to vehicles that are in a key-off state, and not being propelled via either an on-board energy storage device such as a battery, or by a vehicle engine. For example, if the vehicle is in operation, even if the engine is not being operated, driving conditions may result in significant fuel slosh events in the fuel tank which may contribute to pressure changes in the fuel tank. Such pressure changes as a function of driving conditions may contribute significantly to adding noise factors to any analysis of crowd-based fuel tank integrity diagnostics, thus rendering such an approach susceptible to error. As such, it may be understood that the methodology described herein relates to vehicles in a keyed-off state, and not to vehicles in operation.

Furthermore, in order for such a diagnostic to provide robust results, undesired evaporative emissions may not be present in the fuel tank of the vehicle being diagnosed. For example, if it is indicated that there is a presence of undesired evaporative emissions stemming from the fuel tank of the vehicle being diagnosed, then the fuel tank may not hold pressure/vacuum, and thus, the diagnostic discussed above for determining whether the structural standoffs in the fuel tank are degraded, may not be robust. Accordingly, there may be several options for determining whether the fuel tank of the vehicle being diagnosed is free from undesired evaporative emissions, as will be discussed below with regard to FIGS. 4-6.

FIG. 4 shows an example flow chart for a high-level method 400 for performing an evaporative emissions leak test in a hybrid-electric vehicle. More specifically, method 400 describes a method for performing an evaporative emissions leak test without the use of a vacuum pump, and without loading a fuel vapor canister with fuel tank vapors. Method 400 will be described in reference to the systems described in FIGS. 1-3, though it should be understood that method 400 may be applied to other systems without departing from the scope of this disclosure. Method 400 may be carried out by a controller, such as controller 212, and may be stored as executable instructions in non-transitory memory. Instructions for carrying out method 400 and the rest of the methods included herein may be executed by the controller based on instructions stored on a memory of the controller and in conjunction with signals received from sensors of the vehicle system, such as the sensors described above with reference to FIGS. 1-3. The controller may employ fuel system and evaporative emissions system actuators such as FTIV (e.g., 252), etc., according to the methods depicted below.

Method 400 begins at 405 by evaluating current vehicle operating conditions. Operating conditions may be estimated, measured, and/or inferred, and may include ambient conditions, such as temperature, humidity, barometric pressure, etc., engine conditions, such as engine operating status, engine speed, engine load, etc., as well as fuel system conditions, such as fuel level, fuel tank pressure, fuel vapor canister load status, etc. Continuing at 410, method 400 may include determining whether the vehicle is in a vehicle-on state. If the vehicle is in a vehicle-on state, method 400 may proceed to 412. At 412, method 400 may include entering a vehicle-on leak test. An example vehicle-on leak test is described further herein and with regards to FIGS. 5-6. Method 400 may then end.

If the vehicle is not in a vehicle-on state, method 400 may proceed to 415. At 415, method 400 may include determining whether the vehicle soak duration is greater than a threshold. The vehicle soak duration may comprise the length of time elapsed from the most recent vehicle-off event. The vehicle soak duration threshold may be predetermined (e.g., 4-6 hours) or may be based on operating conditions. For example, the vehicle soak duration may be based on the ambient temperature, a change in ambient temperature during the vehicle soak duration, an expected change in ambient temperature during the vehicle soak based on the time of day, an amount of heat rejected to the fuel tank during the previous vehicle-on condition, which may in turn be based on engine operating conditions during the previous vehicle-on condition, etc. As discussed, it may be understood that in this example method 400, the fuel tank is sealed, via the controller commanding or maintaining the fuel tank isolation valve closed during method 400. Accordingly, for such a vehicle with an isolated fuel tank, the vehicle soak duration threshold may be based on an expected amount of time necessary for the fuel tank to undergo a threshold change in temperature, and thus develop either a positive pressure or a vacuum there within. If the vehicle soak duration is less than the threshold, method 400 may proceed to 417. At 417, method 400 may include maintaining the fuel tank isolated (via maintaining the FTIV closed) for the threshold duration. The vehicle controller may be put to sleep and re-awoken while maintaining the fuel tank isolation valve closed.

When the vehicle soak duration has increased above the threshold, method 400 may proceed to 420. At 420, method 400 may include determining whether the absolute fuel tank pressure is greater than a threshold. Absolute fuel tank pressure may be estimated, inferred, or measured, for example by FTPT 291. The absolute fuel tank pressure threshold may be based on operating conditions, such as ambient barometric pressure, ambient temperature, fuel fill level and fuel composition. The absolute fuel tank pressure threshold may be based on a pressure/vacuum that would be indicative of an intact fuel tank. In other words, if the fuel tank included the presence of undesired evaporative emissions stemming from a source in the fuel tank of a threshold size, the threshold pressure/vacuum would be unlikely to be reached.

However, an absolute fuel tank pressure below the threshold may not necessarily be indicative of degradation. Rather, the fuel tank may be at a zero-crossing point of the diurnal cycle. As the ambient temperature increases and decreases throughout the diurnal cycle, there may be instances over a 24 hour cycle where a fuel tank with an absence of undesired evaporative emissions has a fuel tank pressure that is not holding pressure or vacuum with respect to atmospheric pressure. As such, if the absolute fuel tank pressure is not greater than the pressure threshold, method 400 may proceed to 422. At 422, method 400 may include sleeping the controller for a duration, and then re-awakening the controller. The sleeping duration may be predetermined (e.g., 3 hours) or may be based on ambient conditions, such as ambient temperature and time of day. The sleeping duration may be based on a length of time over which a change in fuel tank pressure would be expected for an intact fuel tank. Continuing at 425, method 400 may include determining whether the absolute fuel tank pressure is greater than a threshold. The absolute fuel tank pressure threshold may be the same as the threshold described at 420, or may be adjusted based on updated current operating conditions, such as ambient temperature and barometric pressure. If the absolute fuel tank pressure is not greater than the threshold, method 400 may proceed to 427. At 427, method 400 may include indicating the presence of undesired evaporative emissions stemming from the fuel tank. Indicating the presence of undesired evaporative emissions may include setting a flag at controller 212, and may further include indicating degradation to the vehicle user, such as via illuminating a malfunction indicator lamp (MIL). Proceeding to 435, method 400 may include updating vehicle operating parameters. For example, controller 212 may take mitigating action based on the presence of undesired evaporative emissions, such as preventing the vehicle from operating in an engine-only mode. Controller 212 may further adjust the evaporative emissions leak testing schedule. Method 400 may then end.

If the absolute fuel tank pressure is greater than the threshold, at either 420 or 425, method 400 may proceed to 430. At 430, method 400 may include indicating the absence of undesired evaporative emissions. Indicating the absence of undesired evaporative emissions may further include recording a passing test result at controller 212.

Proceeding to 435, method 400 may include updating vehicle operating parameters. For example, responsive to the indication of the absence of undesired evaporative emissions, current vehicle operating parameters may be maintained. Method 400 may then end.

FIG. 5 shows an example flow chart for a high-level method 500 for performing an evaporative emissions leak test in a hybrid-electric vehicle during a vehicle-on condition. Method 500 may be executed independently, or as a subroutine of another method, such as method 400. Method 500 will be described in reference to the systems described in FIGS. 1-3, though it should be understood that method 500 may be applied to other systems without departing from the scope of this disclosure. Method 500 may be carried out by a controller, such as controller 212, and may be stored as executable instructions in non-transitory memory. Instructions for carrying out method 500 and the rest of the methods included herein may be executed by the controller based on instructions stored on a memory of the controller and in conjunction with signals received from sensors of the vehicle system, such as the sensors described above with reference to FIGS. 1-3. The controller may employ fuel system and evaporative emissions system actuators such as CPV (e.g., 261), FTIV (e.g., 252), CVV (e.g., 297), motor (e.g., 120), etc., according to the methods depicted below.

Method 500 begins at 505 by evaluating operating conditions. Operating conditions may be estimated, measured, and/or inferred, and may include ambient conditions, such as temperature, humidity, barometric pressure, etc., engine conditions, such as engine operating status, engine speed, engine load, etc., as well as fuel system conditions, such as fuel level, fuel tank pressure, fuel vapor canister load status, etc. Continuing at 510, method 500 may include determining whether the vehicle is in an engine-on state. If the vehicle is in an engine-on state, method 500 may proceed to 512. At 512, method 500 may include entering an engine-on leak test. An example engine-on leak test is described further herein and with regards to FIG. 6. Method 500 may then end.

If the engine is not on, method 500 may proceed to 515. At 515, method 500 may include determining whether the absolute fuel tank pressure is greater than a threshold, as described with regard to FIG. 3. In example method 500 it may be understood that the vehicle fuel tank comprises a sealed fuel tank, where the fuel tank is sealed via the FTIV (e.g. 252). If the absolute fuel tank pressure is greater than the threshold, method 500 may proceed to 517. At 517, method 500 may include indicating that there is an absence of undesired evaporative emissions stemming from the fuel tank. With an absence of undesired evaporative emissions indicated at the fuel tank, method 500 may include maintaining current vehicle operating conditions. Method 500 may then end.

If, at 515, the absolute fuel tank pressure is less than the threshold, method 500 may proceed to 520. At 520, method 500 may include spinning the engine unfueled to generate an engine intake vacuum. Spinning the engine unfueled may include operating the motor (e.g. 120) to rotate the engine, without providing fueling and spark to engine cylinders. Responsive to engine intake manifold vacuum reaching a threshold intake manifold vacuum, method 500 may proceed to 525. At 525, method 500 may include the controller commanding open the CPV, commanding closed the CVV, and commanding open the FTIV. By commanding open the FTIV, the fuel tank may be fluidically coupled to the evaporative emissions system, and by commanding open the CPV, the fuel tank (and fuel system) and evaporative emissions system may be coupled to engine intake. Furthermore, by closing the CVV, the fuel system and evaporative emissions system may be sealed from atmosphere.

With the fuel system and evaporative emissions system sealed from atmosphere, and coupled to engine intake, method 500 may proceed to 530. At 530, method 500 may include evacuating the fuel system and evaporative emissions system to a threshold negative pressure (e.g. threshold vacuum), monitored for example via the FTPT (e.g. 291). While not explicitly shown, it may be understood that an inability to reach the threshold negative pressure may be the result of gross undesired evaporative emissions stemming from the fuel system and/or evaporative emissions system. Accordingly, in such a situation, method 500 may include indicating the presence of gross undesired evaporative emissions stemming from the fuel system and/or evaporative emissions system.

Responsive to the threshold negative pressure being reached in the fuel system and evaporative emissions system, method 500 may proceed to 535. At 535, method 500 may include sealing the fuel tank and fuel system from the evaporative emissions system. Furthermore, at 535, method 500 may include stopping the engine spinning unfueled via the controller commanding the motor to cease the spinning of the engine. The fuel tank may be sealed from the evaporative emissions system via the controller sending a signal to the FTIV, actuating it closed. At 535, method 500 may also include the controller commanding or actuating closed the CPV to decouple engine intake from the evaporative emissions system. Furthermore, in some examples the CVV may be commanded open, thus relieving vacuum from the evaporative emissions system. With the fuel tank sealed from the evaporative emissions system, and with engine spinning stopped, method 500 may proceed to 540. At 540, method 500 may include measuring a pressure bleed-up rate, and accordingly, may include indicating whether the pressure bleed-up rate of change in the fuel tank is greater than a predetermined pressure bleed-up rate threshold. If the pressure bleed-up rate of change is greater than the pressure bleed-up rate threshold, method 500 may proceed to 545, and may include indicating the presence of undesired evaporative emissions stemming from the fuel tank. As discussed above with regard to FIG. 4, responsive to an indication of the presence of undesired evaporative emissions stemming from the fuel tank, method 500 may include setting a flag at the controller, and may include illuminating a MIL on the vehicle dash, alerting the vehicle operator of the need to service the vehicle. Furthermore, mitigating actions may be taken, such as preventing engine operation where possible, rescheduling tests for undesired evaporative emissions, etc. Method 500 may then proceed to 550, and may include relieving the fuel tank vacuum by commanding open the FTIV for a brief period of time, and then may include resealing the fuel tank by commanding close the FTIV. Method 500 may then end.

Returning to 540, responsive to pressure bleed-up rate of change being less than the pressure bleed-up rate threshold, method 500 may proceed to 555. At 555, method 500 may include indicating an absence of undesired fuel tank emissions. With an absence of undesired fuel tank emissions indicated, method 500 may include maintaining current vehicle operating parameters. Proceeding to 550, method 500 may include relieving fuel tank vacuum via commanding open the FTIV, and then resealing the fuel tank via commanding closed the FTIV. While the method described includes relieving the fuel tank vacuum at 550, in some examples, the fuel tank vacuum may not be relieved, and in such an example the FTIV may be maintained closed responsive to the indication of either the presence or absence of undesired evaporative emissions. Method 500 may then end.

FIG. 6 shows an example flow chart for a high-level method 600 for performing an evaporative emissions leak test in a hybrid-electric vehicle during an engine-on condition. Method 600 may be executed independently, or as a subroutine of another method, such as methods 400 and/or 500. Method 600 will be described in reference to the systems described in FIGS. 1-3, though it should be understood that method 600 may be applied to other systems without departing from the scope of this disclosure. Method 600 may be carried out by a controller, such as controller 212, and may be stored as executable instructions in non-transitory memory. Instructions for carrying out method 600 and the rest of the methods included herein may be executed by the controller based on instructions stored on a memory of the controller and in conjunction with signals received from sensors of the vehicle system, such as the sensors described above with reference to FIGS. 1-3. The controller may employ fuel system and evaporative emissions system actuators such as CPV (e.g., 261), FTIV (e.g., 252), CVV (e.g., 297), etc., according to the methods depicted below.

Method 600 begins at 605 by evaluating operating conditions. Operating conditions may be estimated, measured, and/or inferred, and may include ambient conditions, such as temperature, humidity, barometric pressure, etc., engine conditions, such as engine operating status, engine speed, engine load, etc., as well as fuel system conditions, such as fuel level, fuel tank pressure, fuel vapor canister load status, etc. Continuing at 610, method 600 may include determining whether an absolute fuel tank pressure is greater than a threshold, as discussed above with regard to FIGS. 4-5. If, at 610 it is indicated that absolute fuel tank pressure is greater than the threshold, method 600 may proceed to 615. At 615, method 600 may include indicating that there is an absence of undesired evaporative emissions stemming from the fuel tank. With an absence of undesired evaporative emissions indicated at the fuel tank, method 600 may include maintaining current vehicle operating conditions. Method 600 may then end.

Returning to 610, if the absolute fuel tank pressure is not greater than the threshold, method 600 may proceed to 620. At 620, method 600 may include determining whether the intake manifold vacuum is greater than a threshold intake manifold vacuum, as discussed above with regard to FIG. 5. Intake manifold vacuum may be estimated, inferred, or measured, such as by a pressure sensor (e.g., 213) in the intake manifold. The threshold intake manifold vacuum may be based on an amount of vacuum necessary to evacuate the fuel system and evaporative emissions system. The intake manifold vacuum threshold may thus be based on the volumes of the fuel system and evaporative emissions system, and may be further based on fuel level, fuel composition, etc. If pressure in the intake manifold is not less negative than the threshold, method 600 may proceed to 625. At 625, method 600 may include continuing to monitor fuel tank pressure and intake manifold vacuum, and may further include setting a flag to follow up with additional testing for the presence or absence of undesired evaporative emissions when the threshold negative pressure is present in the intake manifold.

Returning to 620, if the intake manifold vacuum is greater (e.g. more negative with respect to the threshold) than the intake manifold vacuum threshold, method 600 may proceed to 630. At 630, method 600 may include the controller commanding open the CPV, commanding closed the CVV, and commanding open the FTIV. By commanding open the FTIV, the fuel tank may be fluidically coupled to the evaporative emissions system, and by commanding open the CPV, the fuel tank (and fuel system) and evaporative emissions system may be coupled to engine intake. Furthermore, by closing the CVV, the fuel system and evaporative emissions system may be sealed from atmosphere.

With the fuel system and evaporative emissions system sealed from atmosphere, and coupled to engine intake, method 600 may proceed to 635. At 635, method 600 may include evacuating the fuel system and evaporative emissions system to a threshold negative pressure (e.g. threshold vacuum), monitored for example via the FTPT (e.g. 291). While not explicitly shown, it may be understood that an inability to reach the threshold negative pressure may be the result of gross undesired evaporative emissions stemming from the fuel system and/or evaporative emissions system. Accordingly, in such a situation, method 600 may include indicating the presence of gross undesired evaporative emissions stemming from the fuel system and/or evaporative emissions system.

Responsive to the threshold negative pressure being reached in the fuel system and evaporative emissions system, method 600 may proceed to 640. At 640, method 600 may include sealing the fuel tank and fuel system from the evaporative emissions system (e.g. decoupling the fuel system from the evaporative emissions system). The fuel tank may be sealed from the evaporative emissions system via the controller sending a signal to the FTIV, actuating it closed. At 640, method 600 may also include the controller commanding or actuating closed the CPV to decouple engine intake from the evaporative emissions system (and fuel system). Furthermore, in some examples the CVV may be commanded open, thus relieving vacuum from the evaporative emissions system. With the fuel tank sealed from the evaporative emissions system, method 600 may proceed to 645. At 645, method 600 may include measuring a pressure bleed-up rate, and accordingly, may include indicating whether the pressure bleed-up rate of change in the fuel tank is greater than a predetermined pressure bleed-up rate threshold. If the pressure bleed-up rate of change is greater than the pressure bleed-up rate threshold, method 600 may proceed to 650, and may include indicating the presence of undesired evaporative emissions stemming from the fuel tank. As discussed above with regard to FIGS. 4-5, responsive to an indication of the presence of undesired evaporative emissions stemming from the fuel tank, method 600 may include setting a flag at the controller, and may include illuminating a MIL on the vehicle dash, alerting the vehicle operator of the need to service the vehicle. Furthermore, mitigating actions may be taken, such as preventing engine operation where possible, rescheduling tests for undesired evaporative emissions, etc. Method 600 may then proceed to 655, and may include relieving the fuel tank vacuum by commanding open the FTIV for a brief period of time, and then may include resealing the fuel tank by commanding close the FTIV. Method 500 may then end.

Returning to 645, responsive to pressure bleed-up rate of change being less than the pressure bleed-up rate threshold, method 600 may proceed to 660. At 660, method 600 may include indicating an absence of undesired fuel tank emissions. With an absence of undesired fuel tank emissions indicated, method 600 may include maintaining current vehicle operating parameters. Proceeding to 655, method 600 may include relieving fuel tank vacuum via commanding open the FTIV, and then resealing the fuel tank via commanding closed the FTIV. While the method described above includes relieving the fuel tank vacuum at 655, in some examples, the fuel tank vacuum may not be relieved, and in such an example the FTIV may be maintained closed responsive to the indication of either the presence or absence of undesired evaporative emissions. Method 600 may then end.

Turning now to FIG. 7, an example illustration of a diurnal cycle 700 as a graph of solar intensity and temperature as a function of the time of day, is shown. Incoming solar radiation 702 begins increasing at sunrise 704, and rises to a maximum near mid-day before declining until sunset 706. As such, sunrise 704 marks a time of day near where a heat gain cycle is at its greatest, and sunset 706 marks a time of day near where a heat loss cycle is at its greatest. Accordingly, ambient temperature 708 is shown, illustrating the increase in temperature from a minimum temperature 710 near sunrise 704, and the decrease in temperature from a maximum temperature 712 near sunset 706.

As will be discussed in detail below, in order to diagnose whether structural standoffs in a vehicle fuel tank of a vehicle being diagnosed are degraded, pressure in the fuel tank of the vehicle being diagnosed (VD) may be compared to crowd-sourced fuel tank pressure data from one or more, or a plurality of vehicles, located within a predetermined distance of the VD. Pressure in the fuel tank of the VD, as well as pressure in the one or more fuel tanks of vehicles comprising the crowd-sourced fuel tank pressure data, may be retrieved or indicated at or near one of the minimum temperature 710, and/or maximum temperature 712 while the VD is in a key-off condition, and where the vehicles comprising the crowd-sourced fuel tank pressure data are also in key-off condition(s). Furthermore, data related to fuel level in the fuel tank of the VD and the vehicles comprising the crowd may be indicated or retrieved at or near the minimum temperature 710 and/or the maximum temperature 712. As will be discussed in further detail below with regard to FIGS. 8-9, crowd-sourced data comprising one or more of fuel tank pressure and/or fuel level may be compared to one or more of fuel tank pressure and/or fuel level in the VD. If the crowd-sourced data is correlated with data retrieved from the VD, then it may be determined that the structural standoffs in the VD are functioning as desired, and are not degraded. However, if one or more of the fuel tank pressure data and/or the fuel level data from the VD are not correlated with the fuel tank pressure data and/or fuel level data retrieved from the crowd, then it may be indicated that the structural standoffs in the VD are degraded, or not functioning as desired.

It may be understood that indicating or retrieving information or data related to fuel tank pressure and/or fuel level in fuel tanks comprising the crowd and the VD at the maximum and/or minimum temperatures may in some examples comprise indicating or retrieving the data for a period of time near the maximum or minimum temperature. For example, it may be desirable to obtain more than one, or a plurality of fuel tank pressure measurements from each individual vehicle comprising the crowd, over a predetermined period of time near the maximum or minimum temperatures of the diurnal cycle. Similarly, it may be desirable to obtain more than one, or a plurality of fuel level measurements from each individual comprising the crowd, over a predetermined time period near the maximum or minimum temperatures of the diurnal cycle. In some examples, the predetermined time period for retrieving fuel tank pressure data may comprise the same predetermined time period for retrieving fuel level data, but in other examples the predetermined time periods may differ. As examples, predetermined time periods may include 30 minutes, 1 hour, 2 hours, 3 hours, etc. As one example, if the maximum temperature occurs at 5:00 p.m., and the predetermined time period comprises 1 hour, then pressure data may be retrieved starting at 4:30 p.m., and may be continued to be retrieved until 5:30 p.m. A similar procedure may be conducted with regard to retrieving fuel level data. In such examples, it may be understood that fuel tank pressure data and fuel level may be retrieved for both the crowd and for the VD, over the course of the predetermined time period. Furthermore, as discussed, the data related to fuel level may be retrieved over a predetermined time that is different than the time course for retrieving fuel tank pressure data, from both the VD and the crowd.

In some examples, fuel level data may be retrieved for a greater amount of time near the maximum or minimum temperature, as compared to fuel tank pressure data. As one example, if the maximum temperature is indicated to occur at 5:00 p.m., the predetermined time period for retrieving fuel tank pressure data may comprise 1 hour, while the predetermined time period for retrieving fuel level data may comprise 2 hours. In such an example, fuel tank pressure data may be retrieved from 4:30-5:30, while fuel level data may be retrieved from 4 p.m. to 6 p.m. Such examples are meant to be exemplary.

In examples where fuel tank pressure data and/or fuel level data is retrieved from the VD and the crowd over predetermined time periods, it may be understood that such data may be retrieved periodically. For example, the data may be retrieved at intervals comprising 5 minutes, 10 minutes, 20 minutes, 30 minutes, etc. As one example, fuel tank pressure data may be recorded every 5 minutes for an hour from each of the vehicles comprising the crowd, and for the VD. Similarly, fuel level data may be recorded every 5 minutes for an hour from each of the vehicles comprising the crowd, and for the VD. In such examples, data may be averaged for each vehicle comprising the crowd to obtain a mean measurement for each data set comprising the crowd. Then the mean measurements from each vehicle comprising the crowd may be averaged, to obtain a mean crowd fuel tank pressure and/or a mean crowd fuel level. Similarly a mean VD fuel tank pressure and/or a mean VD fuel level may be obtained from the VD. In this way, mean crowd fuel tank pressure and/or mean crowd fuel level may be compared to mean VD fuel tank pressure and/or mean VD fuel level, respectively, to ascertain whether the fuel tank pressure data is correlated between the VD and the crowd, and/or whether the fuel level data is correlated between the VD and the crowd.

Turning now to FIG. 8, a high level example method 800 for entering into a fuel tank diagnostic, is shown. More specifically, method 800 may be utilized to assess whether conditions are indicated to be met for conducting a fuel tank diagnostic, and if so, then weather forecast data may be retrieved via the vehicle controller, and the fuel tank diagnostic may be scheduled for either a time period comprising a maximum temperature or a minimum temperature of a diurnal cycle. Based on the scheduling of the diagnostic, at the scheduled time the vehicle controller may be woken up in order to conduct the diagnostic.

Method 800 will be described with reference to the systems described herein, and shown in FIGS. 1-3, though it should be understood that similar methods may be applied to other systems without departing from the scope of this disclosure. Method 800 may be carried out by a controller, such as controller 212 in FIG. 2, and may be stored at the controller as executable instructions in non-transitory memory. Instructions for carrying out method 800 and the rest of the methods included herein may be executed by the controller based on instructions stored on a memory of the controller and in conjunction with signals received from sensors of the vehicle system, such as the sensors described above with reference to FIGS. 1-3. The controller may employ fuel system and evaporative emissions system actuators such as fuel tank isolation valve (FTIV) (e.g. 252), etc., according to the methods depicted below.

Method 800 begins at 805 and may include evaluating current vehicle operating conditions. Operating conditions may be estimated, measured, and/or inferred, and may include ambient conditions, such as temperature, humidity, barometric pressure, etc., engine conditions, such as engine operating status, engine speed, engine load, etc., as well as fuel system conditions, such as fuel level, fuel tank pressure, fuel vapor canister load status, etc. Continuing at 810, method 800 may include indicating whether conditions are met for conducting a VD (vehicle being diagnosed) fuel tank diagnostic, where the fuel tank diagnostic includes using V2X or V2I2V technology to determine whether the VD has a fuel tank that is degraded as discussed above with regard to FIG. 3 and FIG. 7. Conditions being met for conducting the VD may include an indication that the fuel tank of the VD is free from undesired evaporative emissions. For example, any one of the methods depicted above at FIGS. 4-6 may be utilized to determine whether the fuel tank is free from undesired evaporative emissions.

Conditions being met for conducting the diagnostic may further include a threshold duration of time passing since a prior fuel tank test diagnostic. The threshold duration may comprise 1 day, greater than 1 day but less than 5 days, greater than 5 days but less than 10 days, greater than 10 days but less than 20 days, greater than 20 days but less than 30 days, greater than 30 days but less than 60 days, greater than 60 days but less than 100 days, etc.

Conditions being met at 810 may further include a key-off condition, for example.

If, at 810, it is indicated that conditions are not met for conducting the fuel tank diagnostic, method 800 may proceed to 815, and may include maintaining current vehicle operating conditions. For example, if the vehicle is in operation, the vehicle may be maintained in operation. In some examples maintaining the vehicle in operation may include maintaining fueling the engine to propel the vehicle. In other examples, maintaining the vehicle in operation may include maintaining the vehicle being propelled via an electric-only mode of operation. In still other examples, maintaining operation may include maintaining a hybrid operation where the vehicle is being propelled via some level of contribution from the engine as well as some level of contribution from an onboard energy storage device (e.g. battery). If, in other examples, the vehicle is in a key-off state but where conditions are still not met for conducting the fuel tank diagnostic, maintaining current vehicle operating parameters may include maintaining the vehicle in a key-off condition. Such examples are meant to be illustrative. Method 800 may then end.

Returning to 810, responsive to conditions being met for conducting the fuel tank diagnostic, method 800 may proceed to 820. At 820, method 800 may include commanding closed the vehicle FTIV (e.g. 252). By commanding closed the FTIV, the fuel tank may be sealed from atmosphere, and from the evaporative emissions system of the vehicle.

Proceeding to 825, method 800 may include obtaining forecast weather data. For example, control system 214 (e.g. 190) may be configured to receive information via the internet or other communication networks in order to obtain weather information in the vicinity of the VD, where the vicinity of the VD may include weather information within a predetermined distance (in all directions) of the VD. Such weather information may be retrieved from one or more data servers, including government and/or private data collection services that provide forecast weather data in a retrievable format. The weather information may be based on the location of the vehicle as determined by the onboard GPS in some examples. The retrieved weather data may include forecasted temperature, humidity, barometric pressure, precipitation, wind, etc. It may be understood that such retrieved forecast weather information may be communicated to the vehicle controller, where the data may be processed via the controller. In one example, the retrieved weather information or data may include forecasted weather information for the next 24 hours. In other examples, a shorter or longer amount of forecasted weather information may be retrieved.

With the weather forecast information retrieved by the VD controller, method 800 may proceed to 830. At 830, method 800 may include indicating whether the forecasted weather data indicates a threshold temperature change for a predetermined duration, where the predetermined duration may comprise 24 hours, for example. In one example, the threshold temperature change may comprise 15° C. However, the threshold temperature change may comprise greater than 15° C. in some examples, and less than 15° C. in other examples. It may be understood that the predetermined duration may comprise a duration where an expected pressure change may occur in the VD, for example, and may in some examples be a function of ambient weather conditions, fuel level in the fuel tank of the VD, fuel composition, etc.

If, at 830, it is indicated that the forecasted weather information is indicative of a temperature change less than the threshold temperature change, then method 800 may proceed to 835. At 835, method 800 may include scheduling a follow-up test for the fuel tank diagnostic, to be conducted when conditions are indicated to be met for conducting the diagnostic, and where forecast weather conditions indicate that the threshold temperature change is forecasted. At 835, method 800 may further include maintaining current vehicle operating conditions, as discussed above with regard to step 815 of method 800. Method 800 may then end.

Returning to 830, responsive to the threshold temperature change being forecasted, method 800 may proceed to 840. At 840, method 800 may include obtaining weather information related to when a maximum temperature and when a minimum temperature for the diurnal cycle is forecasted. For example, the forecast weather information may indicate a maximum temperature at 4:30 p.m., while the minimum temperature may be forecast at 5:30 a.m. Such examples are meant to be illustrative. As discussed above and which will be further discussed below, at the times near and including the maximum and/or minimum temperatures of the diurnal cycle, crowd data related to fuel tank pressure and/or fuel level may be retrieved from a plurality of vehicles of similar make/model to the VD, such that it may be ascertained as to whether the VD fuel tank is degraded.

Accordingly, proceeding to 845, method 800 may include scheduling the controller to wake at a determined time point based on the forecast maximum/minimum temperature(s) as determined at 840 of method 800. As discussed above at FIG. 7, in some examples it may be scheduled to wake the controller at a determined time at or near the maximum and/or minimum temperature(s). As discussed, in some examples, it may be desirable to obtain more than one or a plurality of measurements related to fuel tank pressure in the VD as well as from a crowd of vehicles, as discussed above and which will be further discussed below. Thus, the plurality of measurements may be retrieved for a predetermined time period, encompassing the maximum and/or minimum temperatures. As an example, if the predetermined time period comprises 1 hour, and the maximum temperature is indicated to occur at 5 p.m., then the controller may be woken at 4:30 p.m. In such an example, both fuel tank pressure and fuel level from the VD and the crowd of vehicles may be retrieved for the predetermined time period as discussed above at FIG. 7. However, there may be circumstances where it may be desirable to obtain fuel level measurements for a longer, or shorter period than the fuel tank pressure measurements. In such examples, the determined time to wake the controller may be a function of whichever predetermined time period is longer. For example, if it is desired to conduct 2 hours of fuel level measurements and the maximum temperature is forecast at 5 p.m., while it is desired to conduct 1 hour of fuel tank pressure measurements, then the controller may be woken at 4 p.m. such that two hours of fuel level measurements may be obtained from 4 p.m. to 6 p.m., encompassing the forecast maximum temperature. Responsive to scheduling the controller to wake at the determined time, method 800 may include sleeping the controller.

Proceeding to 850, it may be determined whether the determined time to wake the controller is indicated. If the determined time is not indicated, method 800 may include maintaining current vehicle operating conditions, which in this case may include maintaining the vehicle controller in the sleep mode of operation, until the determined time is indicated.

Responsive to the determined time being indicated at 850, method 800 may proceed to 860. At 860, method 800 may include waking the controller. With the controller awake, method 800 may proceed to 865, and may include conducting the fuel tank diagnostic according to FIG. 9. Method 800 may then end.

Turning now to FIG. 9, a high level example method 900 for conducting a fuel tank diagnostic, is shown. More specifically, method 900 may be utilized to retrieve one or more data sets related to fuel tank pressure and fuel level in a one or more vehicles, or a crowd of vehicles, such that the data may be compared to equivalent data obtained from the vehicle being diagnosed (VD). Based on whether the data obtained from the VD correlates with the data obtained from the crowd of vehicles, it may be ascertained as to whether the VD fuel tank is degraded, or not. As discussed, method 900 may proceed from method 800 depicted at FIG. 8.

Method 900 will be described with reference to the systems described herein, and shown in FIGS. 1-3, though it should be understood that similar methods may be applied to other systems without departing from the scope of this disclosure. Method 900 may be carried out by a controller, such as controller 212 in FIG. 2, and may be stored at the controller as executable instructions in non-transitory memory. Instructions for carrying out method 900 and the rest of the methods included herein may be executed by the controller based on instructions stored on a memory of the controller and in conjunction with signals received from sensors of the vehicle system, such as the sensors described above with reference to FIGS. 1-3. The controller may employ fuel system and evaporative emissions system actuators such as canister vent valve (CVV) (e.g. 297), canister purge valve (CPV) (e.g. 261), fuel tank isolation valve (FTIV) (e.g. 252), etc., according to the methods depicted below.

Method 900 begins at 905 and may include generating the crowd of vehicles, or the select crowd of vehicles. In some examples, the crowd of vehicles may be referred to as a plurality of vehicles, a group of vehicles, a set of vehicles, etc. To generate, or select the crowd of vehicles from which the VD may retrieve fuel tank pressure data and/or fuel level data from, the following procedure, carried out by the VD controller, may be utilized. For example, the VD may send a wireless request to one or more vehicles within wireless communication or within a predetermined threshold distance or radius (e.g. 320) of the VD. The wireless request may comprise a request for information from the vehicles, the information comprising data related to time since last key-off, engine run time for the most recent previous drive cycle prior to the key-off event, fuel level, vehicle make/model information, whether the vehicles have sealed fuel tanks, fuel tank pressure data, etc. Of the vehicles that receive the wireless request, if may be further determined which of the vehicles to retrieve one or more data sets related to fuel tank pressure and fuel level from. It may be understood that the determined vehicles from which to retrieve the one or more data sets from may comprise the crowd, select crowd, plurality of vehicles, group of vehicles, set of vehicles, etc. The crowd may be selected as a function of vehicle make/model, for example only vehicles with a similar make/model to the vehicle being diagnosed may be considered for selection. For example, if the VD comprises a small sedan, then a large truck may be excluded from the crowd. The crowd may additionally or alternatively be selected as a function of whether the vehicle(s) have a fuel tank that is normally sealed except for events such as refueling, conducting diagnostic tests, etc. For example, vehicles that do not comprise sealed fuel tanks may be excluded from the crowd. The crowd may be additionally or alternatively selected as a function of whether the vehicle(s) have a fuel level within a predetermined fuel level range. As one example, the crowd may be selected as a function of whether the vehicle(s) fuel level is within a threshold fuel level of the fuel level indicated for the VD. Vehicles that do not have a fuel level within the threshold fuel level of the fuel level indicated for the VD may be excluded from the crowd. The crowd may additionally or alternatively be selected as a function of a time since key-off, for example a time since key-off greater than a threshold key-off duration. The threshold key-off duration may comprise a duration where any heat rejection from the engine from a previous drive cycle is no longer contributing to fuel vapor generation in the fuel tank, or is no longer affecting fuel tank temperature. For example, vehicles that have not been off for the threshold key-off duration may be excluded from the crowd.

With the vehicles comprising the crowd having been selected via the VD controller processing the wireless request, method 900 may proceed to 910. At 910, method 900 may include retrieving one or more data sets comprising fuel tank pressure and/or one or more data sets comprising fuel level from the vehicles comprising the crowd. The retrieving the one or more data sets comprising fuel tank pressure and/or one or more data sets comprising fuel level may be conducted via wireless communication between the VD controller and one or more controllers of the vehicles comprising the crowd. As discussed above with regard to FIG. 3 and FIG. 7, in some examples the data comprising fuel tank pressure and/or fuel level data may be retrieved over a predetermined time period.

Responsive to retrieving the fuel tank pressure and/or fuel level data from the vehicles comprising the crowd, method 900 may proceed to 915. At 915, method 900 may include processing the data retrieved from the crowd. As discussed above, in some examples the data comprising fuel tank pressure may be processed to determine a mean fuel tank pressure data for each vehicle, and may further be processed to determine mean total fuel tank pressure from all of the vehicles comprising the crowd over the predetermined time period that the data was retrieved. Similarly, a mean fuel tank pressure may be determined for the VD.

With regard to the fuel level data retrieved from the crowd, the one or more data sets comprising fuel level may be processed to determine a variability in fuel level for each vehicle over the predetermined time period. The variability in fuel level for each vehicle may then be averaged, to obtain a mean total fuel level variability for the crowd. Similarly, fuel level variability may be determined for the VD. It may be understood that the controller of the VD may process the data as discussed.

With the data retrieved from the crowd having been processed, and with the data from the VD having been determined, at 915, method 900 may further include the VD controller comparing the processed fuel tank pressure data from the VD with the processed fuel tank pressure data from the crowd. Additionally or alternatively, at 915, method 900 may include the VD controller comparing the processed fuel level data from the VD with the processed fuel tank pressure data from the crowd.

Proceeding to 920, method 900 may include indicating whether the retrieved data is correlated with the data obtained from the VD. As discussed above, fuel tank pressure data from the VD being correlated with the fuel tank pressure data from the crowd may include the fuel tank pressure data from the VD being within a threshold (e.g. within 5% or less) of the fuel tank pressure data from the crowd. Similarly, fuel level data from the VD being correlated with the fuel level data from the crowd may include variability in fuel level data from the VD being within a threshold (e.g. within 5% or less), of the variability in fuel level data from the crowd.

If, at 920, it is indicated that the data is correlated, method 900 may proceed to 930 and may include indicating an absence of fuel tank degradation, which may include an indication that the structural standoffs in the fuel tank are not degraded.

Responsive to the indication of the absence of fuel tank degradation, method 900 may proceed to 935, and may include updating vehicle operating conditions. Updating vehicle operating conditions at 935 may include recording the passing result comprising the indication that the fuel tank of the VD is not degraded at the VD controller (e.g. 212). Furthermore, updating vehicle operating conditions at 935 may include maintaining current evaporative emissions testing schedules, maintaining current fuel vapor canister purging schedules, maintaining current engine operating conditions (at the next key-on event), etc. Method 900 may then end.

Returning to 920, responsive to an indication that the fuel tank pressure and/or fuel level data from the VD is not correlated with the data retrieved from the crowd, method 900 may proceed to 925, and may include indicating fuel tank degradation, which may include indicating that the structural standoffs in the fuel tank of the VD may be degraded. Such an indication may include setting a flag at the controller of the VD, and may further include illuminating a malfunction indicator light (MIL) at a dash of the VD, alerting the vehicle operator of the need to service the vehicle.

Proceeding to 928, method 900 may include taking mitigating actions responsive to the indication that the fuel tank of the VD is degraded. Taking mitigating actions may in some examples include commanding open the FTIV (e.g. 252). By commanding open the FTIV, the fuel tank of the VD may not be susceptible to fuel tank pressure changes, which may be beneficial to preserving the integrity of the fuel tank. It may be understood that, in commanding open the FTIV, the CVV (e.g. 297) may additionally be commanded open, if not already open. With the FTIV and the CVV commanded open, the fuel tank of the VD may be coupled to atmosphere, thus the fuel tank of the VD may be maintained at or near atmospheric pressure.

Proceeding to 935, method 900 may include updating vehicle operating conditions as a function of the indicated fuel tank degradation. Specifically, with the fuel tank coupled to atmosphere, fuel tank vapors may be routed to the fuel vapor canister (e.g. 222), where the vapors may be adsorbed. However, because the VD may comprise a hybrid (e.g. PHEV) with limited engine run time, engine run time may be scheduled to increase as a result of coupling the fuel tank to the fuel vapor storage canister. More specifically, because fuel vapors are no longer contained within the sealed fuel tank as a result of coupling the fuel tank to the fuel vapor storage canister and to atmosphere, when the vehicle is in operation it may be desirable to purge the canister of fuel vapors more frequently than under conditions where the fuel tank of the VD is sealed, which may be conducted via engine manifold vacuum which may occur while the vehicle is in operation with the engine combusting fuel and air.

Thus, for example, responsive to the indication that the fuel tank is degraded, mitigating actions may include operating the engine more frequently when the vehicle is in operation, such that the fuel vapor canister may be purged more consistently. In some examples, a fuel vapor canister load may be determined via one or more temperature sensor(s) (e.g. 232). As discussed, as fuel vapor is adsorbed by the adsorbent in the canister, heat may be generated, which may be monitored by the one or more temperature sensors positioned in the canister, and the temperature changes may be utilized via the VD controller to indicate fuel vapor canister loading state. Thus, in some examples, responsive to an indication that the canister is saturated or nearly saturated with fuel vapors, the engine may be commanded on in order to purge fuel vapors from the canister to engine intake for combustion. Method 900 may then end.

As discussed above with regard to method 900, fuel vapor canister purging operations may be increased in response to the FTIV being commanded open, due to the increased amount of fuel vapors being adsorbed via the canister under conditions where the fuel tank is indicated to be degraded (e.g. degraded structural standoffs). Accordingly, proceeding to FIG. 10, an example method is illustrated for purging the fuel vapor storage canister of the VD.

FIG. 10 thus illustrates a high-level example method 1000 for conducting a purging operation in the VD. Method 1000 will be described with reference to the systems described herein, and shown in FIGS. 1-3, though it should be understood that similar methods may be applied to other systems without departing from the scope of this disclosure. Method 1000 may be carried out by a controller, such as controller 212 in FIG. 2, and may be stored at the controller as executable instructions in non-transitory memory. Instructions for carrying out method 1000 and the rest of the methods included herein may be executed by the controller based on instructions stored on a memory of the controller and in conjunction with signals received from sensors of the vehicle system, such as the sensors described above with reference to FIGS. 1-3. The controller may employ fuel system and evaporative emissions system actuators such as canister vent valve (CVV) (e.g. 297), canister purge valve (CPV) (e.g. 261), fuel tank isolation valve (FTIV) (e.g. 252), etc., according to the methods depicted below.

Method 1000 begins at 1005 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 1010, method 1000 may include indicating whether canister purging conditions are met. Canister purging conditions may be indicated to be met responsive to an indication of an engine-on condition, an intake manifold vacuum greater than a threshold intake manifold vacuum, where the threshold relates to an amount of vacuum sufficient to draw fuel vapors from the fuel vapor canister. Conditions being met at 1010 may further include an indication of a canister load greater than a threshold (e.g. saturated or nearly saturated with fuel vapors), etc. If canister purge conditions are not met, method 1000 may proceed to 1015, and may include maintaining current engine, evaporative emissions system, and fuel system status. For example, if it is indicated that the vehicle engine is off, the engine may be maintained off. In another example, if it is indicated that the vehicle engine is on, engine operation may be maintained according to current engine operating conditions. Furthermore, at 1015, maintaining fuel system and evaporative emissions system status may include maintaining canister purge valve (e.g. 261), fuel tank isolation valve (e.g. 252), and canister vent valve (e.g. 297), in their current configurations. Method 1000 may then end.

Returning to 1010, if it is indicated that canister purge conditions are met, method 1000 may proceed to 1020. At 1020, method 1000 may include commanding open or maintaining open canister vent valve (e.g. 297). At 1020, method 1000 may additionally include maintaining FTIV open, in a case where the FTIV is open as a result of the indication of fuel tank degradation, as discussed with regard to FIG. 9. However, in other examples where fuel tank degradation is indicated, the FTIV may be commanded close responsive to purge conditions being met, to exclude the fuel tank (which may be degraded) from being exposed to vacuum from the intake manifold during the purge operation.

With the canister vent valve open (and the FTIV either open or closed), method 1000 may proceed to 1025 and may include duty cycling the CPV. As described above, vacuum generated by the intake manifold of the operating engine may thus draw fresh air through the fuel vapor canister (e.g. 222), to purge stored fuel vapors to the engine for combustion. During purging, a learned vapor concentration may be used to determine the amount of fuel vapors stored in the canister. In some examples the duty cycle of the first canister purge valve may be adjusted responsive to engine operating conditions (e.g. vacuum level in the intake manifold), and may further be adjusted based on canister load.

Proceeding to 1030, method 1000 may include indicating whether fuel vapor canister load is below a predetermined threshold canister load. In one example, canister load may be indicated via the change in temperature in the fuel vapor canister as monitored via the one or more temperature sensor(s) positioned in the canister. In some examples, the predetermined threshold canister load may be a canister load indicating that the canister is nearly free of stored fuel vapors. For example, the predetermined threshold canister load may comprise a canister load of 25%, 20%, 15%, 10%, or less.

As such, at 1030, if it is indicated that the canister load is not below the predetermined threshold canister load, method 1000 may return to 1025 and may include continuing to duty cycle the CPV until is it indicated that canister load has reached the predetermined threshold canister load. Alternatively, at 1030, if it is indicated that canister load has reached the predetermined threshold canister load, method 1000 may proceed to 1035. At 1035, method 1000 may include commanding closed CPV. By commanding closed the CPV, the evaporative emissions system (and fuel system if the FTIV is kept open) may be decoupled from engine intake. Responsive to commanding closed the CPV, if the FTIV was commanded closed during the purge, and if the fuel tank has been previously indicated to be degraded (e.g. structural standoffs degraded) as discussed with regard to FIGS. 8-9, then the FTIV may be commanded open again, to couple the fuel tank to atmosphere via the open CVV.

Proceeding to 1045, method 1000 may include updating canister loading state, and updating the canister purge schedule. For example, the canister loading state may be updated to reflect the recent purge event. Updating the canister purge schedule at 1045 may include scheduling further canister purge events responsive to the canister loading state indicated after the recent purge event. Method 1000 may then end.

Turning now to FIG. 11, an example timeline 1100 for conducting a fuel tank test diagnostic, is shown. More specifically, timeline 1100 illustrates an example timeline for conducting the fuel tank diagnostic discussed above with regard to FIG. 3, FIG. 7, and FIGS. 8-9. Timeline 1100 includes plot 1105, indicating whether the vehicle being diagnosed (VD) is in operation (e.g. key-on) (yes) or not (no), and plot 1110, indicating whether conditions are met (yes) for the fuel tank diagnostic or not (no), over time. Timeline 1100 further includes plot 1115, indicating fuel tank pressure in the VD, as monitored by the VD FTPT (e.g. 291), over time. Timeline 1000 further includes plot 1120, indicating fuel level (as monitored via a fuel level indicator, FLI) in the VD, over time. Fuel level may increase (+) or decrease (−) in the fuel tank. Timeline 1100 further includes plot 1125, indicating whether the VD FTIV is open or closed, over time. Timeline 1100 further includes plot 1130, indicating ambient temperature, over time. Line 1131 represents a predetermined time period for retrieving information from vehicles comprising the crowd. Timeline 1100 further includes plot 1135, indicating whether crowd data has been retrieved (yes) or not (no) via the VD controller, over time. Timeline 1100 further includes plot 1140, indicating mean crowd fuel level change, or variability, over time. Variability may either be non-applicable (n/a), no variability (0), or greater variability than 0 (+). Timeline 1100 further includes plot 1145, indicating mean crowd fuel tank pressure, over time. Mean crowd fuel tank pressure may be non-applicable (n/a), or may be greater (e.g. increase) (+) or less (e.g. decrease) (−), over time. Timeline 1100 further includes plot 1150, indicating whether VD data comprising fuel level and/or fuel tank pressure is correlated (yes) or not (no) with the crowd data comprising fuel tank pressure and/or fuel level. Timeline 1100 further includes plot 1155, indicating whether degradation is present (yes), or not (no), in the VD fuel tank (e.g. degradation of the structural standoffs), over time. Timeline 1100 further includes plot 1160, indicating VD fuel vapor canister load, over time. Canister load may increase (+) or decrease (−), over time.

At time t0, the vehicle is in operation (plot 1105), and accordingly, conditions are not indicated to be met for conducting the fuel tank diagnostic (plot 1100). There is significant positive pressure (with respect to atmosphere) in the VD fuel tank (plot 1115). The fuel tank of the VD is more than half full (plot 1120), and the VD FTIV is in a closed configuration (plot 1125). Ambient temp is cooler (plot 1130). Because conditions are not yet indicated to be met for conducting the fuel tank diagnostic, crowd data is not indicated to be retrieved (plot 1135), mean crowd fuel level change is non-applicable (plot 1140), mean crowd fuel tank pressure is non-applicable (plot 1145), and whether VD data is correlated with crowd data is also non-applicable (plot 1150). VD fuel tank degradation is not indicated (1155), where fuel tank degradation relates to degradation of the structural standoffs in the VD fuel tank. Finally, VD fuel vapor canister load is indicative of the VD canister being less than half-saturated.

At time t1, a key-off event is indicated. Accordingly, the controller of the VD may determine whether conditions are met for conducting the fuel tank diagnostic, as discussed above at step 810 of method 800. Responsive to conditions being met at time t1, the VD fuel tank may be sealed from atmosphere (plot 1125). Furthermore, as discussed with regard to FIG. 8, forecasted weather data may be obtained via the VD controller. While not explicitly illustrated in timeline 1100, it may be understood that at time t1 it may be further indicated as to whether a threshold temperature change is forecasted for the next 24 hour period. In this example timeline 1100, it may be understood that the threshold temperature change is forecasted, as indicated via the VD controller responsive to receiving the forecasted weather information. Based on the forecasted weather data, a timepoint for the maximum temperature of the diurnal cycle, and a timepoint for the minimum temperature of the diurnal cycle may be determined via the VD controller. With the maximum/minimum temperature(s) determined or indicated, the VD controller may be scheduled to wake at or near the determined maximum and/or minimum temperature(s). After scheduling the wake time at time t1, the VD controller may be put to sleep.

Between time t1 and t2, ambient temperature rises while the VD controller is asleep with the FTIV closed. While the VD controller is not awake to monitor FTPT and fuel level, the FTPT and fuel level for the VD is illustrated for illustrative purposes. For example, between time t1 and t3, pressure in the fuel tank remains stable or decreases slightly, which may be indicative of an increase in fuel tank volume, which may occur if the structural standoffs are degraded. Additionally, at time t2, there is a drop in fuel level, which may occur if the fuel tank increases in volume under circumstances where the structural standoffs are degraded.

At time t3, the vehicle controller is woken up, as the scheduled wake time has been indicated. The vehicle controller may remain awake for the predetermined time period for which to conduct the test diagnostic. The predetermined time period is illustrated by line 1131. Accordingly, at time t3, the VD controller may determine a crowd of vehicles from which to receive one or more data sets comprising fuel tank pressure and one or more data sets comprising fuel level data from, and may thus begin receiving said data sets (plot 1135). It may be understood that the predetermined time period, represented by line 1131 may comprise a time duration encompassing the maximum (or in other examples minimum) temperature of the diurnal cycle. In this example, it may be understood, based on plot 1130, that the predetermined time period encompasses the maximum temperature. Furthermore, it may be understood that fuel level data and fuel tank pressure data may be retrieved via the VD controller for the VD during the predetermined time period.

At time t4, fuel level in the VD decreases slightly, represented by plot 1120. Similarly, at time t5, fuel level again decreases slightly. Such events may be indicative of the VD fuel tank expanding or increasing in volume. Accordingly, pressure in the VD fuel tank is indicated to decrease slightly during the predetermined time period, likely the result of the VD fuel tank increasing in volume, or expanding. It may be understood that such events related to fuel level change, or variability, and fuel tank pressure in the VD may be recorded via the VD controller.

Alternatively, during the predetermined time period represented by line 1131, fuel level change in the crowd of vehicles (e.g. mean fuel level variability over time), is indicated to be stable, or little to no variability. Similarly, mean crowd fuel tank pressure remains stable over the predetermined time period 1131. Accordingly, at time t6, when it is indicated that the predetermined time period for retrieving fuel level and fuel tank pressure measurements from the crowd and from the VD has elapsed, it may be understood that conditions are no longer indicated to be met for conducting the fuel tank diagnostic (plot 1110). Accordingly, at time t6, the data retrieved from the VD corresponding to fuel level and fuel tank pressure data may be compared to the fuel level and fuel tank pressure data retrieved from the crowd. At time t6, it is indicated that the VD data is not correlated with the crowd data (plot 1150), as the VD data comprising fuel level was indicated to be variable (see plot 1120), and the fuel tank pressure data was not stable, and was less than the mean crowd fuel tank pressure data. Accordingly, at time t6, VD fuel tank degradation is indicated, which may comprise an indication that the VD fuel tank structural standoffs are degraded. With the VD structural standoffs indicated to be degraded, the FTIV of the VD is commanded open at time t6, thus coupling the fuel tank of the VD to atmosphere (via an open CVV (not shown in timeline 1100). With the VD FTIV commanded open at time t6, fuel tank vapors are routed to the fuel vapor storage canister (e.g. 222), and accordingly, fuel vapor storage canister load increases for the VD (plot 1160), between time t6 and t7.

In this way, it may be ascertained as to whether structural standoffs in a vehicle fuel tank are functioning as desired, or if they have become degraded. By periodically conducting such a test, any issues related to fuel tank integrity may be discovered such that mitigating action may be undertaken to preserve the integrity of the fuel tank. Such action may lead to a reduction of undesired evaporative emissions stemming from the fuel tank, for example, as a fuel tank with degraded structural standoffs may be more prone to result in the development of sources of undesired evaporative emissions.

The technical effect is to recognize that by using V2V or V2I2V communications technology, a fuel tank of the vehicle being diagnosed (VD) may be diagnosed as to the integrity of structural standoffs positioned in the fuel tank, without coupling the fuel tank to a fuel vapor storage canister, which may reduce undesired evaporative emissions in hybrid vehicles. A further technical effect is to recognize that, responsive to an indication of fuel tank degradation (e.g. structural standoff degradation), the fuel tank of the VD may be coupled to a fuel vapor storage canister and to atmosphere, to preserve structural integrity of the fuel tank. A still further technical effect is to recognize that, responsive to coupling the VD fuel tank to the fuel vapor storage canister and atmosphere, a canister purge schedule may be updated such that the canister is purged more frequently, to reduce opportunities for undesired evaporative emissions resulting from saturating the fuel vapor storage canister with fuel tank fuel vapors.

The systems described herein, and with reference to FIGS. 1-3, along with the methods described herein, and with reference to FIGS. 4-6 and FIGS. 8-10, may enable one or more systems and one or more methods. In one example, a method comprises sealing a fuel tank of a vehicle being diagnosed; retrieving data related to fuel tank pressure from a crowd of related vehicles; and indicating the fuel tank of the vehicle being diagnosed is degraded responsive to data related to fuel tank pressure from the crowd insufficiently correlating with a set of data related to fuel tank pressure from the vehicle being diagnosed. In a first example of the method, the method may include wherein retrieving data related to fuel tank pressure from the crowd includes retrieving data wirelessly from the crowd via a controller of the vehicle being diagnosed. A second example of the method optionally includes the first example, and further comprises, prior to retrieving data related to fuel tank pressure from the crowd, conducting a test for a presence or an absence of undesired evaporative emissions stemming from the fuel tank of the vehicle being diagnosed; and retrieving data related to fuel tank pressure from the crowd responsive to an indication of the absence of undesired evaporative emissions stemming from the fuel tank of the vehicle being diagnosed, where retrieving data related to fuel tank pressure from the crowd further comprises a key-off condition for the vehicle being diagnosed. A third example of the method optionally includes any one or more or each of the first through second examples, and further includes wherein the crowd of vehicles includes vehicles with a similar make/model of the vehicle being diagnosed, vehicles with sealed fuel tanks, vehicles with fuel levels within a predetermined fuel level range, vehicles that have not been in operation for a threshold key-off duration and/or vehicles within a predetermined distance of the vehicle being diagnosed. A fourth example of the method optionally includes any one or more or each of the first through third examples, and further includes wherein the predetermined fuel level range includes fuel levels within a threshold fuel level of a fuel level indicated for the vehicle being diagnosed. A fifth example of the method optionally includes any one or more or each of the first through fourth examples, and further includes wherein data related to fuel tank pressure from the crowd includes one or more data sets comprising fuel tank pressure data and one or more data sets comprising fuel level data from fuel tanks of vehicles comprising the crowd; and wherein the set of data related to fuel tank pressure from the vehicle being diagnosed includes a set of fuel level data from the vehicle being diagnosed, and a set of fuel tank pressure data from the vehicle being diagnosed. A sixth example of the method optionally includes any one or more or each of the first through fifth examples and further includes wherein data related to fuel tank pressure from the crowd insufficiently correlating with the set of data related to fuel tank pressure from the vehicle being diagnosed includes an indication that data related to fuel tank pressure from the crowd is not within a predetermined threshold of the set of data related to fuel tank pressure from the vehicle being diagnosed. A seventh example of the method optionally includes any one or more or each of the first through sixth examples, and further includes wherein retrieving data related to fuel tank pressure from the crowd includes retrieving data related to fuel tank pressure from the crowd for a predetermined time period encompassing a maximum and/or minimum temperature of a diurnal cycle. An eighth example of the method optionally includes any one or more or each of the first through seventh examples, and further comprises taking mitigating action responsive to an indication that the fuel tank of the vehicle being diagnosed is degraded. A ninth example of the method optionally includes any one or more or each of the first through eighth examples, and further includes wherein the mitigating action includes fluidically coupling the fuel tank to a fuel vapor storage canister positioned in an evaporative emissions system of the vehicle; and wherein the fuel tank and the fuel vapor storage canister are further fluidically coupled to atmosphere. A tenth example of the method optionally includes any one or more or each of the first through ninth examples, and further includes wherein indicating the fuel tank of the vehicle being diagnosed is degraded includes indicating that one or more structural supports in the fuel tank are degraded, or are not functioning as desired. An eleventh example of the method optionally includes any one or more or each of the first through tenth examples, and further includes wherein the fuel tank is plastic; and wherein the vehicle comprises a hybrid vehicle.

Another example of a method comprises responsive to conditions being met for conducting a fuel tank diagnostic on a vehicle being diagnosed as to whether one or more structural standoffs configured to provide structural integrity to the fuel tank are functioning as desired: sealing a fuel tank of the vehicle being diagnosed; sending a wireless request from a controller of the vehicle being diagnosed to one or more vehicles; selecting a crowd of vehicles from the one or more vehicles from which to retrieve information pertaining to fuel tank pressure from, via the controller of the vehicle being diagnosed; retrieving the information pertaining to fuel tank pressure wirelessly from the crowd of vehicles; comparing the information pertaining to fuel tank pressure from the crowd of vehicles subsequent to also retrieving a set of data pertaining to fuel tank pressure from the vehicle being diagnosed; and indicating that one or more of the one or more structural standoffs of the vehicle being diagnosed are degraded responsive to the information pertaining to fuel tank pressure from the crowd not correlating with the set of data pertaining to fuel tank pressure from the vehicle being diagnosed. In a first example of the method, the method includes wherein conditions being met for conducting the fuel tank diagnostic include a key-off condition of the vehicle being diagnosed, a time since key-off greater than a threshold duration, and/or an indication that the fuel tank of the vehicle being diagnosed is free from a presence of undesired evaporative emissions. A second example of the method optionally includes the first example, and further includes wherein selecting the crowd includes excluding vehicles from the crowd that comprise vehicles that are not of the same make/model of the vehicle being diagnosed, excluding vehicles from the crowd that comprise vehicles without sealed fuel tanks, excluding vehicles from the crowd that do not have fuel levels within a predetermined fuel level range, and excluding vehicles from the crowd that have not been deactivated or shut down for a threshold key-off duration. A third example of the method optionally includes any one or more or each of the first and second examples, and further includes wherein subsequent to sealing the fuel tank of the vehicle being diagnosed and prior to sending the wireless request from the controller of the vehicle being diagnosed to one or more vehicles, sleeping the controller of the vehicle being diagnosed; and waking the controller of the vehicle being diagnosed at a predetermined time point near either a maximum temperature of a diurnal cycle or a minimum temperature of the diurnal cycle to select the crowd of vehicles, to retrieve the information pertaining to fuel tank pressure from the crowd, and to also retrieve the set of data pertaining to fuel tank pressure from the vehicle being diagnosed. A fourth example of the method optionally includes any one or more or each of the first through third examples, and further comprises taking mitigating action responsive to the indication that one or more of the one or more structural standoffs of the vehicle being diagnosed are degraded, where taking mitigating action includes: unsealing the fuel tank of the vehicle being diagnosed to fluidically couple the fuel tank to atmosphere; capturing fuel vapors from the fuel tank of the vehicle being diagnosed in a fuel vapor storage canister positioned in an evaporative emissions system of the vehicle being diagnosed; and updating a schedule for purging the fuel vapor storage canister in order to purge fuel vapors from the fuel vapor storage canister more frequently responsive to the fuel tank being fluidically coupled to the fuel vapor storage canister.

An example of a system for a hybrid vehicle comprises a fuel tank selectively fluidically coupled to a fuel vapor canister via a conduit; a fuel tank isolation valve positioned within the conduit between the fuel tank and the fuel vapor canister and configured to seal the fuel tank from the fuel vapor canister and from atmosphere when closed; a fuel tank pressure transducer (FTPT) positioned in a vapor recovery line between the fuel tank and the fuel tank isolation valve; a fuel level indicator positioned in the fuel tank of the hybrid vehicle; a wireless communication device; and a controller configured with instructions stored in non-transitory memory, that when executed cause the controller to: seal the fuel tank; obtain weather forecast data wirelessly to the controller to determine a maximum temperature and a minimum temperature corresponding to a current diurnal cycle; schedule a predetermined time to wake the controller near the maximum temperature or the minimum temperature; sleep the controller subsequent to scheduling the time to wake the controller; wake the controller at the predetermined time to conduct a fuel tank diagnostic on the fuel tank of the hybrid vehicle; conduct the fuel tank diagnostic by retrieving fuel tank pressure data and fuel level data from a crowd of vehicles within a predetermined distance of the hybrid vehicle, retrieve a set of fuel tank pressure data and a set of fuel level data from the hybrid vehicle, and compare fuel tank pressure data and fuel level data from the crowd with the set of fuel tank pressure data and the set of fuel level data from the hybrid vehicle; indicate the fuel tank of the hybrid vehicle is degraded responsive to fuel tank pressure data and fuel level data from the crowd not correlating with the set of fuel tank pressure data and the set of fuel level data, respectively; and take mitigating action to prevent further degradation of the fuel tank of the hybrid vehicle responsive to the fuel tank of the hybrid vehicle being indicated to be degraded, where mitigating action includes the fluidically coupling the fuel tank of the hybrid vehicle to the fuel vapor canister and to atmosphere. In a first example of the system, the system further comprises a temperature sensor positioned in the fuel vapor canister and configured to indicate a canister loading state based on temperature changes within the fuel vapor canister; and wherein the controller stores further instructions to update a purge schedule for the fuel vapor canister to purge the fuel vapor canister responsive to indications that the canister loading state is greater than a threshold loading state. A second example of the system optionally includes the first example, and further includes wherein the controller stores further instructions to indicate the fuel tank of the hybrid vehicle is degraded responsive to fuel tank pressure data and fuel level data from the crowd not correlating with the set of fuel tank pressure data and the set of fuel level data, where not correlating comprises fuel tank pressure data from the crowd differing by greater than 5% from the set of fuel tank pressure data from the hybrid vehicle, and/or fuel level data from the crowd differing by greater than 5% from the set of fuel level data from the hybrid vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
responsive to conditions being met for conducting a fuel tank diagnostic on a vehicle being diagnosed as to whether one or more structural standoffs configured to provide structural integrity to the fuel tank are functioning as desired:
sealing the fuel tank of the vehicle being diagnosed;
retrieving data related to fuel tank pressure from a crowd of related vehicles; and
indicating that one or more of the one or more structural standoffs of the vehicle being diagnosed are degraded or not functioning as desired responsive to data related to fuel tank pressure from the crowd insufficiently correlating with a set of data related to fuel tank pressure from the vehicle being diagnosed, without coupling the fuel tank to a fuel vapor storage canister and without coupling the fuel tank to atmosphere.

2. The method of claim 1, wherein retrieving data related to fuel tank pressure from the crowd includes retrieving data wirelessly from the crowd via a controller of the vehicle being diagnosed, the method further comprising a separate vehicle-on leak diagnostic routine during vehicle-on conditions.

3. The method of claim 1, further comprising, prior to retrieving data related to fuel tank pressure from the crowd, conducting a test for a presence or an absence of undesired evaporative emissions stemming from the fuel tank of the vehicle being diagnosed; and
retrieving data related to fuel tank pressure from the crowd responsive to an indication of the absence of undesired evaporative emissions stemming from the fuel tank of the vehicle being diagnosed, where retrieving data related to fuel tank pressure from the crowd further comprises a key-off condition for the vehicle being diagnosed.

4. The method of claim 1, wherein the crowd of vehicles includes vehicles with a similar make/model of the vehicle being diagnosed, vehicles with sealed fuel tanks, vehicles with fuel levels within a predetermined fuel level range, vehicles that have not been in operation for a threshold key-off duration and/or vehicles within a predetermined distance of the vehicle being diagnosed.

5. The method of claim 4, wherein the predetermined fuel level range includes fuel levels within a threshold fuel level of a fuel level indicated for the vehicle being diagnosed.

6. The method of claim 1, wherein data related to fuel tank pressure from the crowd includes one or more data sets comprising fuel tank pressure data and one or more data sets comprising fuel level data from fuel tanks of vehicles comprising the crowd; and
wherein the set of data related to fuel tank pressure from the vehicle being diagnosed includes a set of fuel level data from the vehicle being diagnosed, and a set of fuel tank pressure data from the vehicle being diagnosed.

7. The method of claim 1, wherein data related to fuel tank pressure from the crowd insufficiently correlating with the set of data related to fuel tank pressure from the vehicle being diagnosed includes an indication that data related to fuel tank pressure from the crowd is not within a predetermined threshold of the set of data related to fuel tank pressure from the vehicle being diagnosed.

8. The method of claim 1, wherein retrieving data related to fuel tank pressure from the crowd includes retrieving data related to fuel tank pressure from the crowd for a predetermined time period encompassing a maximum and/or minimum temperature of a diurnal cycle.

9. The method of claim 1, further comprising:
taking mitigating action responsive to an indication that the fuel tank of the vehicle being diagnosed is degraded.

10. The method of claim 9, wherein the mitigating action includes fluidically coupling the fuel tank to a fuel vapor storage canister positioned in an evaporative emissions system of the vehicle; and
wherein the fuel tank and the fuel vapor storage canister are further fluidically coupled to atmosphere.

11. The method of claim 1, wherein the fuel tank is plastic; and
wherein the vehicle comprises a hybrid vehicle.

12. A method comprising:
responsive to conditions being met for conducting a fuel tank diagnostic on a vehicle being diagnosed as to whether one or more structural standoffs configured to provide structural integrity to the fuel tank are functioning as desired:
sealing a fuel tank of the vehicle being diagnosed;
sending a wireless request from a controller of the vehicle being diagnosed to one or more vehicles;
selecting a crowd of vehicles from the one or more vehicles from which to retrieve information pertaining to fuel tank pressure from, via the controller of the vehicle being diagnosed;
retrieving the information pertaining to fuel tank pressure wirelessly from the crowd of vehicles;
retrieving a set of data pertaining to fuel tank pressure from the vehicle being diagnosed;
comparing the information pertaining to fuel tank pressure from the crowd of vehicles subsequent to the set of data; and
indicating that one or more of the one or more structural standoffs of the vehicle being diagnosed are degraded responsive to the information pertaining to fuel tank pressure from the crowd not correlating with the set of data pertaining to fuel tank pressure from the vehicle being diagnosed.

13. The method of claim 12, wherein conditions being met for conducting the fuel tank diagnostic include a key-off condition of the vehicle being diagnosed, a time since key-off greater than a threshold duration, and/or an indication that the fuel tank of the vehicle being diagnosed is free from a presence of undesired evaporative emissions.

14. The method of claim 12, wherein selecting the crowd includes excluding vehicles from the crowd that comprise vehicles that are not of the same make/model of the vehicle being diagnosed, excluding vehicles from the crowd that comprise vehicles without sealed fuel tanks, excluding vehicles from the crowd that do not have fuel levels within a predetermined fuel level range, and excluding vehicles from the crowd that have not been deactivated or shut down for a threshold key-off duration.

15. The method of claim 12, wherein subsequent to sealing the fuel tank of the vehicle being diagnosed and prior to sending the wireless request from the controller of the vehicle being diagnosed to one or more vehicles, sleeping the controller of the vehicle being diagnosed; and waking the controller of the vehicle being diagnosed at a predetermined time point near either a maximum temperature of a diurnal cycle or a minimum temperature of the diurnal cycle to select the crowd of vehicles, to retrieve the information pertaining to fuel tank pressure from the crowd, and to also retrieve the set of data pertaining to fuel tank pressure from the vehicle being diagnosed.

16. The method of claim 12, further comprising taking mitigating action responsive to the indication that one or more of the one or more structural standoffs of the vehicle being diagnosed are degraded, where taking mitigating action includes:

unsealing the fuel tank of the vehicle being diagnosed to fluidically couple the fuel tank to atmosphere;

capturing fuel vapors from the fuel tank of the vehicle being diagnosed in a fuel vapor storage canister positioned in an evaporative emissions system of the vehicle being diagnosed; and updating a schedule for purging the fuel vapor storage canister in order to purge fuel vapors from the fuel vapor storage canister more frequently responsive to the fuel tank being fluidically coupled to the fuel vapor storage canister.

17. A system for a hybrid vehicle, comprising;

a fuel tank selectively fluidically coupled to a fuel vapor canister via a conduit;

a fuel tank isolation valve positioned within the conduit between the fuel tank and the fuel vapor canister and configured to seal the fuel tank from the fuel vapor canister and from atmosphere when closed;

a fuel tank pressure transducer (FTPT) positioned in a vapor recovery line between the fuel tank and the fuel tank isolation valve;

a fuel level indicator positioned in the fuel tank of the hybrid vehicle;

a wireless communication device; and a controller configured with instructions stored in non-transitory memory, that when executed cause the controller to:

seal the fuel tank;

obtain weather forecast data wirelessly to the controller to determine a maximum temperature and a minimum temperature corresponding to a current diurnal cycle;

schedule a predetermined time to wake the controller near the maximum temperature or the minimum temperature;

sleep the controller subsequent to scheduling the time to wake the controller;

wake the controller at the predetermined time to conduct a fuel tank diagnostic on the fuel tank of the hybrid vehicle;

conduct the fuel tank diagnostic by retrieving fuel tank pressure data and fuel level data from a crowd of vehicles within a predetermined distance of the hybrid vehicle, retrieving a set of fuel tank pressure data and a set of fuel level data from the hybrid vehicle, and comparing fuel tank pressure data and fuel level data from the crowd with the set of fuel tank pressure data and the set of fuel level data from the hybrid vehicle;

indicating the fuel tank of the hybrid vehicle is degraded responsive to fuel tank pressure data and fuel level data from the crowd not correlating with the set of fuel tank pressure data and the set of fuel level data, respectively; and taking mitigating action to prevent further degradation of the fuel tank of the hybrid vehicle responsive to the fuel tank of the hybrid vehicle being indicated to be degraded, where mitigating action includes the fluidically coupling the fuel tank of the hybrid vehicle to the fuel vapor canister and to atmosphere.

18. The system of claim 17, further comprising a temperature sensor positioned in the fuel vapor canister and configured to indicate a canister loading state based on temperature changes within the fuel vapor canister; and wherein the controller stores further instructions to update a purge schedule for the fuel vapor canister to purge the fuel vapor canister responsive to indications that the canister loading state is greater than a threshold loading state.

19. The method of claim 17, wherein the controller stores further instructions to indicate the fuel tank of the hybrid vehicle is degraded responsive to fuel tank pressure data and fuel level data from the crowd not correlating with the set of fuel tank pressure data and the set of fuel level data, where not correlating comprises fuel tank pressure data from the crowd differing by greater than 5% from the set of fuel tank pressure data from the hybrid vehicle, and/or fuel level data from the crowd differing by greater than 5% from the set of fuel level data from the hybrid vehicle.

\* \* \* \* \*